US012801350B2

(12) United States Patent
Choi et al.

(10) Patent No.: US 12,801,350 B2
(45) Date of Patent: Nov. 17, 2026

(54) TRANSPOSING MATRICES BASED ON A MULTI-LEVEL CROSSBAR

(71) Applicant: Microsoft Technology Licensing, LLC, Redmond, WA (US)

(72) Inventors: Jinhang Choi, Bellevue, WA (US); Haishan Zhu, Bellevue, WA (US); Yi Luo, Issaquah, WA (US); Eric S. Chung, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 979 days.

(21) Appl. No.: 17/970,517

(22) Filed: Oct. 20, 2022

(65) Prior Publication Data

US 2024/0134564 A1 Apr. 25, 2024
US 2024/0231682 A9 Jul. 11, 2024

(51) Int. Cl.
*G06F 7/78* (2006.01)

(52) U.S. Cl.
CPC .................................... *G06F 7/78* (2013.01)

(58) Field of Classification Search
CPC ...... G06F 3/061; G06F 3/0656; G06F 3/0679; G06F 7/76; G06F 7/78; G06F 7/785; G06F 15/8007; G06F 17/16
See application file for complete search history.

(56) References Cited

U.S. PATENT DOCUMENTS 9,952,831 B1 * 4/2018 Ross ......................... G06F 7/00
10,067,911 B2 * 9/2018 Gholaminejad .......... G06F 7/78
10,649,772 B2 * 5/2020 Bradford ............. G06F 9/30109
10,997,116 B2 * 5/2021 Reinhardt ........... G06F 15/8061
2018/0032477 A1 2/2018 Gholaminejad

FOREIGN PATENT DOCUMENTS

EP 3129953 B1 11/2020
EP 3916589 A1 12/2021

OTHER PUBLICATIONS

E. Chung et al., "Serving DNNs in Real Time at Datacenter Scale with Project Brainwave," in IEEE Micro, vol. 38, No. 2, pp. 8-20, Mar./Apr. 2018, doi: 10.1109/MM.2018.022071131 (Year: 2018).*

(Continued)

*Primary Examiner* — Andrew Caldwell

(74) *Attorney, Agent, or Firm* — Holzer Patel Drennan

(57) ABSTRACT

Embodiments of the present disclosure include systems and methods for transposing matrices based on a multi-level crossbar. A system may include a memory configured to store a matrix comprising a plurality of elements arranged in a set of rows and a set of columns. A system may include an input buffer configured to retrieve a subset of a plurality of elements from the memory. Each element in the subset of the plurality of elements is retrieved from a different column in the matrix. A system may include a multi-level crossbar configured to perform a transpose operation on the subset of the plurality of elements. A system may include an output buffer configured to receive the transposed subset of the plurality of elements and store, in the memory, each element in the transposed subset of the plurality of elements in a different column in the matrix.

20 Claims, 34 Drawing Sheets

(56) References Cited

OTHER PUBLICATIONS

Bita Darvish Rouhani, Doug Burger, Eric Chung, Rangan Majumder, Sangeetha Shekar, Saurabh Tiwary, Sitaram Lanka, Steve Reinhardt. "A Microsoft custom data type for efficient inference". Dec. 2, 2020. Microsoft Research Blog. (Year: 2020).*

International Search Report and Written Opinion received for PCT Application No. PCT/US2023/031809, Dec. 12, 2023, 10 pages.

Xie Z, et al., "Data mapping scheme and implementation for high-throughput DCT/IDCT transpose memory", 2014, 12th IEEE International Conference on Solid-State and Integrated Circuit Technology (ICSICT), Oct. 28, 2014, pp. 1-3.

Communication under Rule 71(3) EPC Received for European Application No. 23782650.8, mailed on Feb. 24, 2026, 08 pages.

International Preliminary Report on Patentability received for PCT Application No. PCT/US2023/031809, May 1, 2025, 07 pages.

"Intel® Stratix® 10 NX FPGA", Retrieved From: https://www.intel.com/content/www/us/en/products/details/fpga/stratix/10/nx.html, Retrieved Date: Oct. 19, 2022, 5 Pages.

Brown, et al., "Language Models are Few-Shot Learners", In the Proceedings of the 34th International Conference on Neural Information Processing Systems, Dec. 6, 2020, 25 Pages.

Fowers, et al., "A configurable cloud-scale DNN processor for real-time AI", In Proceedings of ACM/IEEE 45th Annual International Symposium on Computer Architecture, Jun. 1, 2018, pp. 1-14.

Kaplan, et al., "Scaling Laws for Neural Language Models", In Repository of arXiv:2001.08361v1, Jan. 23, 2020, pp. 1-30.

Langston, Jennifer, "Microsoft announces new supercomputer, lays out vision for future AI work", Retrieved from: https://blogs.microsoft.com/ai/openai-azure-supercomputer/, May 19, 2020, 10 Pages.

Rouhani, et al., "Pushing the Limits of Narrow Precision Inferencing at Cloud Scale with Microsoft Floating Point", In Proceedings of 34th Conference on Neural Information Processing Systems, Jan. 1, 2020, pp. 1-11.

Vaswani, et al., "Attention is All You Need", In Proceedings of Advances in Neural Information Processing Systems, vol. 30, Dec. 4, 2017, 11 Pages.

Xu, et al., "General and Scalable Parallelization for Neural Networks", Retrieved From: https://ai.googleblog.com/2021/12/general-and-scalable-parallelization.html, Dec. 8, 2021, 5 Pages.

Zhang, et al., "OPT: Open Pre-trained Transformer Language Models", In Repository of arXiv:2205.01068v4, Jun. 21, 2022, 30 Pages.

Decision to Grant a European Patent Pursuant to Article 97(1) Received for European Application No. 23782650.8, Mailed on May 8, 2026, 2 Pages.

* cited by examiner

1000

TRANSPOSING MATRICES BASED ON A MULTI-LEVEL CROSSBAR

BACKGROUND

The present disclosure relates to matrix operations. More particularly, the present disclosure relates to transposing matrices based on a multi-level crossbar.

A matrix is an array of elements arranged in a row and column manner. The elements in a matrix may be any number of different types of data including numbers (e.g., integers, floating point numbers, etc.), symbols, expressions, etc. A matrix transpose operation is an operation where elements in a particular row are rearranged into a corresponding column. Matrix transpose operations are utilized in many applications including image processing, machine learning, etc.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for transposing matrices based on a multi-level crossbar. In some embodiments, a system includes a memory, an input buffer, a multi-level crossbar, and an output buffer. The memory can include several memory banks that stores a matrix. Each memory bank stores a column of elements in the matrix. During a read operation, an element from each memory bank may be simultaneously retrieved. The multi-level crossbar has the same number of inputs and outputs. For a given input, the multi-level crossbar can be configured to route the input to any of the outputs. This allows the multi-level crossbar to route an input at any position to an output at any position.

To transpose the matrix stored in the memory, the input buffer retrieves a set of elements in the matrix from the memory bank such that each retrieved element is from a different row in the matrix. Next, the input buffer provides the set of elements to the multi-level crossbar, which routes the set of elements so that they are in the correct transposed positions. The multi-level crossbar sends the transposed set of elements to the output buffer. The output buffer writes the set of elements to the matrix stored in the memory. During a write operation, the output buffer can simultaneously write a piece of data to each memory bank. This process is repeated for the remaining elements in the matrix that have not been transposed until all the elements in the matrix are transposed.

The techniques described in the present application provide a number of benefits and advantages over conventional methods of transposing matrices. For instance, using a multi-level crossbar enables multiple elements in a matrix to be transposed simultaneously. Conventional methods for transposing matrices sequentially transpose each element in a matrix. As such, employing the multi-level crossbar design allows matrices to be transposed faster.

Figure 1:
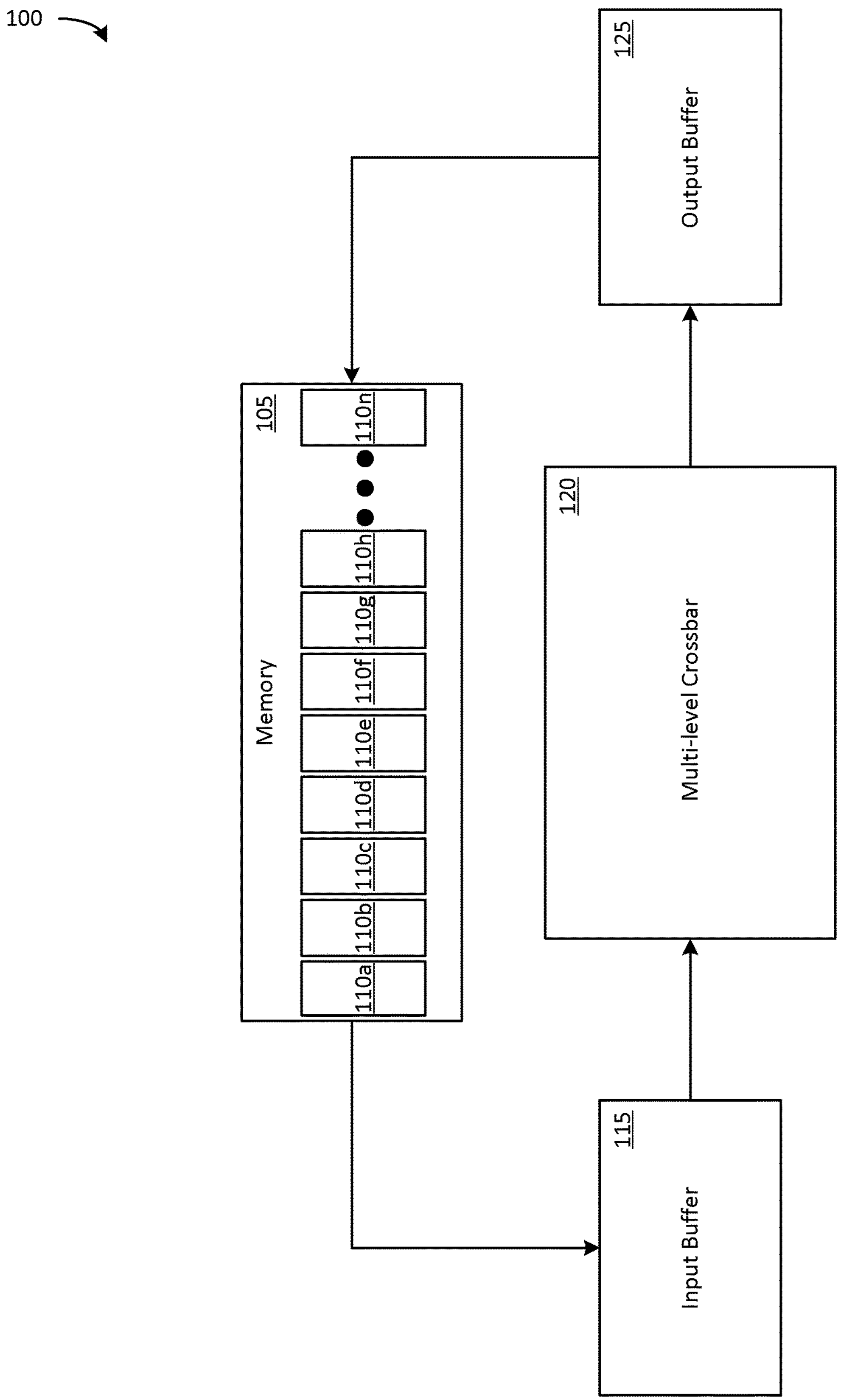
FIG. 1 illustrates a system for transposing matrices based on a multi-level crossbar according to some embodiments.

FIG. 1 illustrates a system 100 for transposing matrices based on a multi-level crossbar according to some embodiments. In some embodiments, all of the components in system 100 are implemented in hardware (e.g., a set of circuits). In other embodiments, all of the components of system 100 are implemented in software. Yet, in some embodiments, the components of system 100 are implemented in a mix of hardware and software. As shown, system 100 includes memory 105, input buffer 115, multi-level crossbar 120, and output buffer 125. As illustrated in FIG. 1, memory 105 includes memory banks 110*a-n*. Each of the memory banks 110*a-n* is configured store data. In some embodiments, during a read operation, each memory bank 110 can be accessed simultaneously. This allows a piece of data to be retrieved from each of the memory banks 110*a-n* at the same time.

Input buffer 115 is configured to perform read operations on memory 105 in order to retrieve data from memory banks 110*a-n*. In some embodiments, input buffer 115 includes memory for storing data retrieved from memory banks 110*a-n*. During a read operation, input buffer 115 may simultaneously retrieve a piece of data from each of the memory banks 110*a-n* and store the retrieved pieces of data in its own memory. Input buffer 115 can provide the data stored in its memory to multi-level crossbar 120 for further processing.

Multi-level crossbar 120 is responsible for performing transpose operations on data received from input buffer 115. In some embodiments, multi-level crossbar 120 includes a set of inputs and a set of outputs. Multi-level crossbar 120 can be configured to shuffle the set of inputs and then provide, via the set of outputs, the shuffled inputs to output buffer 125. For a given input of multi-level crossbar 120, multi-level crossbar 120 can be configured to route the input to any of the outputs of multi-level crossbar 120. In some embodiments, multi-bar crossbar 120 may be implemented by multiple levels of multiplexers (e.g., 2-to-1 multiplexers, 4-to-1 multiplexers, 8-to-1 multiplexers, etc.), where each level of multiplexers are interconnected with an adjacent level(s) of multiplexers.

Output buffer 125 is configured to receive data from multi-level crossbar 120 and write data to memory 105. In some embodiments, output buffer 125 includes memory for storing data retrieved from multi-level crossbar 120. During a write operation, output buffer 125 can simultaneously write a piece of data to each of the memory banks 110*a-n*.

Figure 2:
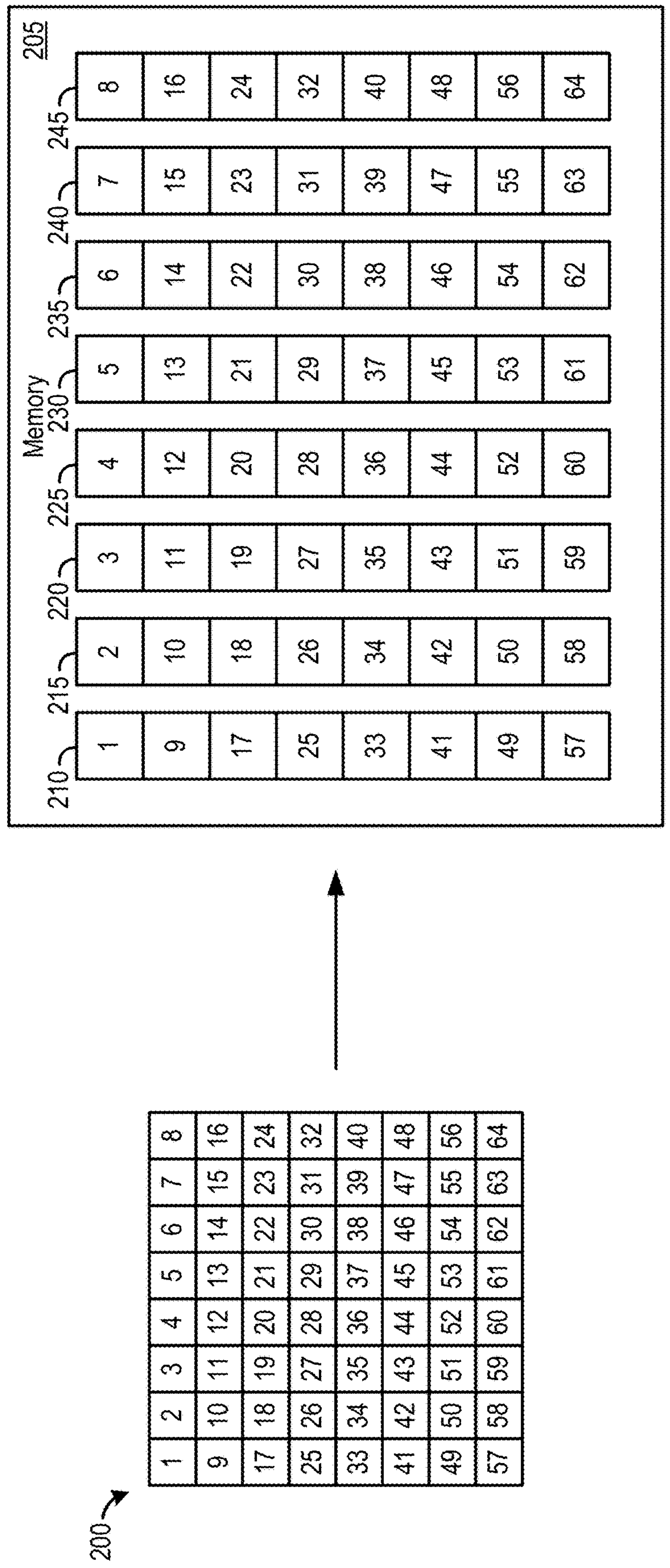
FIG. 2 illustrates an example matrix loaded into a memory according to some embodiments.

An example transpose operation will now be described by reference to FIGS. 2-4. FIG. 2 illustrates an example matrix 200 loaded into a memory 205 according to some embodiments. As depicted, matrix 200 is an 8×8 matrix of numbers. That is, the elements in matrix are arranged in eight rows and eight columns. In this example, memory 205 includes eight memory banks 210-245. Similar to the memory banks 110*a-n* in memory 105, data in memory banks 210-245 can be accessed simultaneously during read and write operations. As shown in FIG. 2, the elements in each row of matrix 200 are stored in different memory banks. In addition, the elements in each column of matrix 200 are stored in the same memory bank.

Figure 3A:
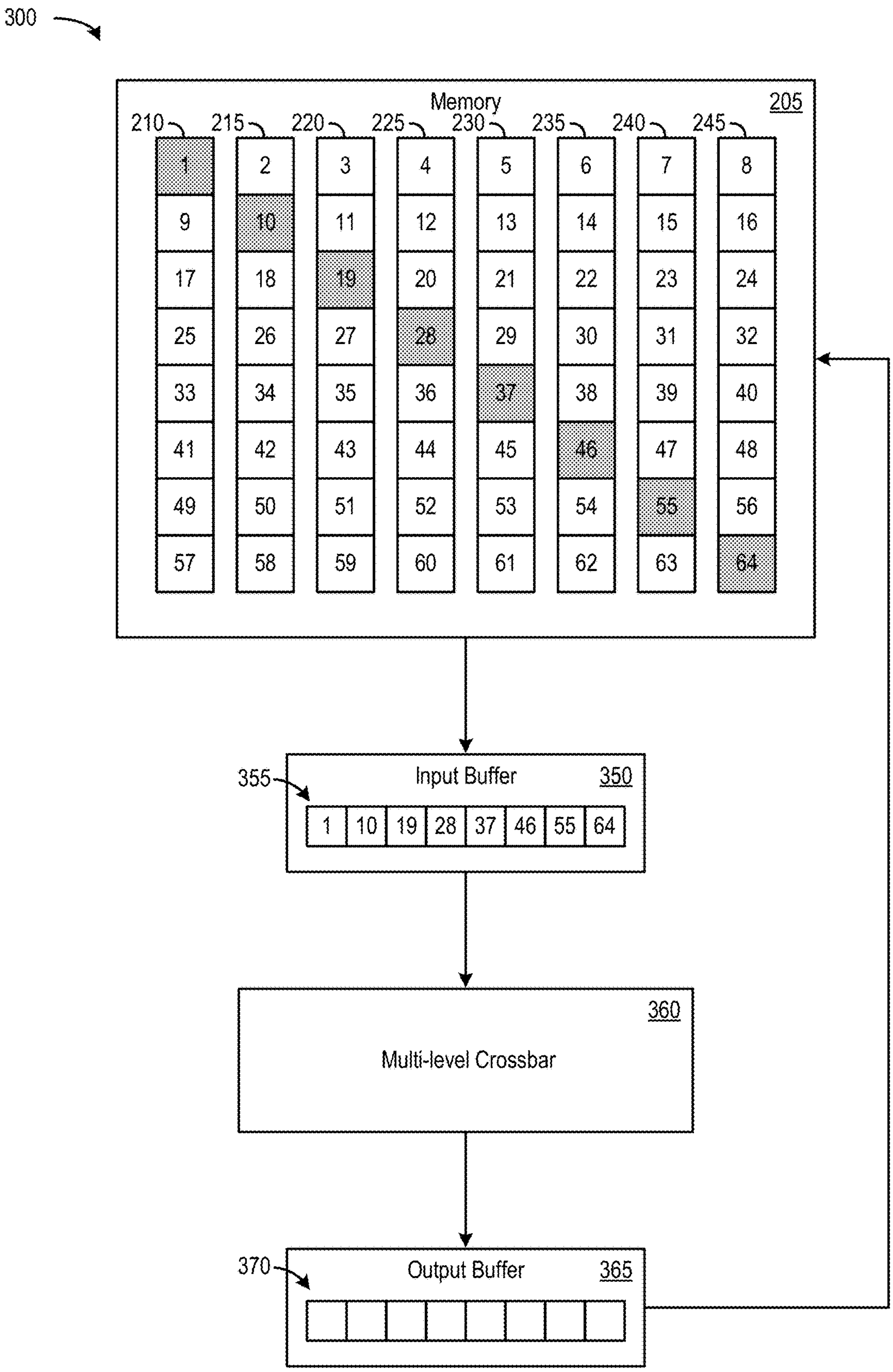
FIGS. 3A-3J illustrate an example of transposing the matrix loaded in the memory illustrated in FIG. 2 according to some embodiments.

FIGS. 3A-3J illustrate an example of transposing matrix 200 loaded in memory 205 according to some embodiments. FIG. 3A illustrates system 300, which includes memory 205, input buffer 350, multi-level crossbar 360, and output buffer 365. In some embodiments, memory 205 can be used to implement memory 105, input buffer 350 can be used to implement input buffer 115, multi-level crossbar 360 can be used to implement multi-level crossbar 120, and output buffer 365 can be used to implement output buffer 125. For this example, input buffer 350 includes memory 355 for storing data retrieved from memory 205. Output buffer 365 includes memory 370 for storing data received from multi-level crossbar 360.

The transpose of matrix 200 begins by input buffer 350 simultaneously retrieving a first set of elements from each of the memory banks 210-245 during a first read operation. As illustrated, input buffer 350 retrieves the first element in memory bank 210, the second element in memory bank 215, the third element in memory bank 220, the fourth element in memory bank 225, the fifth element in memory bank 230, the sixth element in memory bank 235, the seventh element in memory bank 240, and the eighth element in memory bank 245. Next, input buffer 350 stores the retrieved data in memory 355.

Figure 3B:
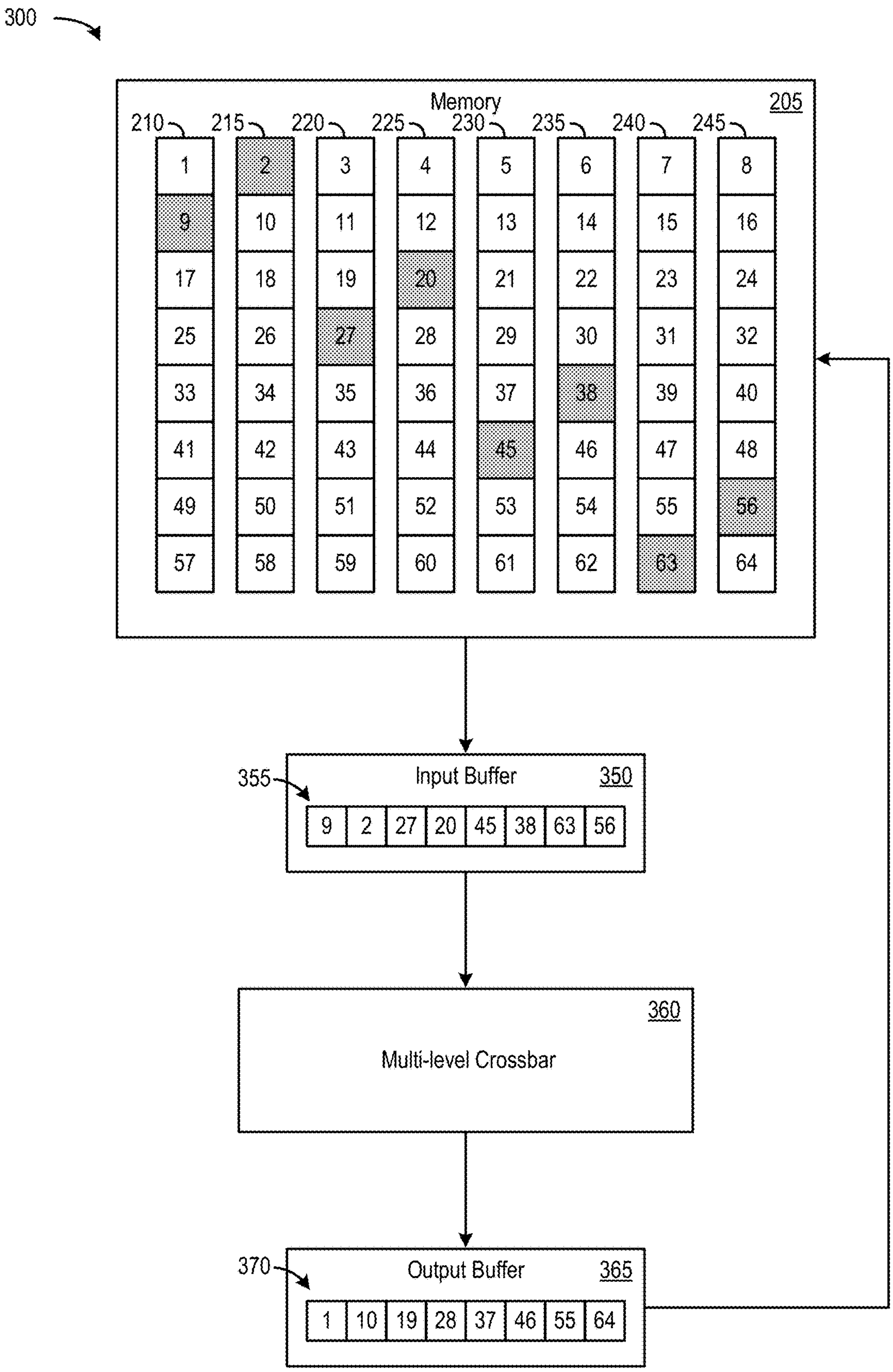

FIG. 3B illustrates system 300 after the first set of elements are processed through multi-level crossbar 360. Specifically, input buffer 350 provides the first set of elements stored in memory 355 to multi-level crossbar 360. Multi-level crossbar 360 is configured to shuffle the first set of elements into their correct transposed positions and provide the transposed first set of elements to memory 370 of output buffer 365. In this example, the positions of the transposed first set of elements are in the same as the positions of the original first set of elements. Thus, multi-level crossbar 360 is configured to output the first set of elements in their same, original positions to memory 370, as depicted in FIG. 3B.

While multi-level crossbar 360 transposes the first set of elements and outputs them to memory 370, input buffer 350 performs a second read operation by simultaneously retrieving a second set of elements from memory banks 210-245. For the second read operation, input buffer 350 retrieves the second element in memory bank 210, the first element in memory bank 215, the fourth element in memory bank 220, the third element in memory bank 225, the sixth element in memory bank 230, the fifth element in memory bank 235, the eighth element in memory bank 240, and the seventh element in memory bank 245. Input buffer 350 stores the retrieved data in memory 355.

Figure 3C:
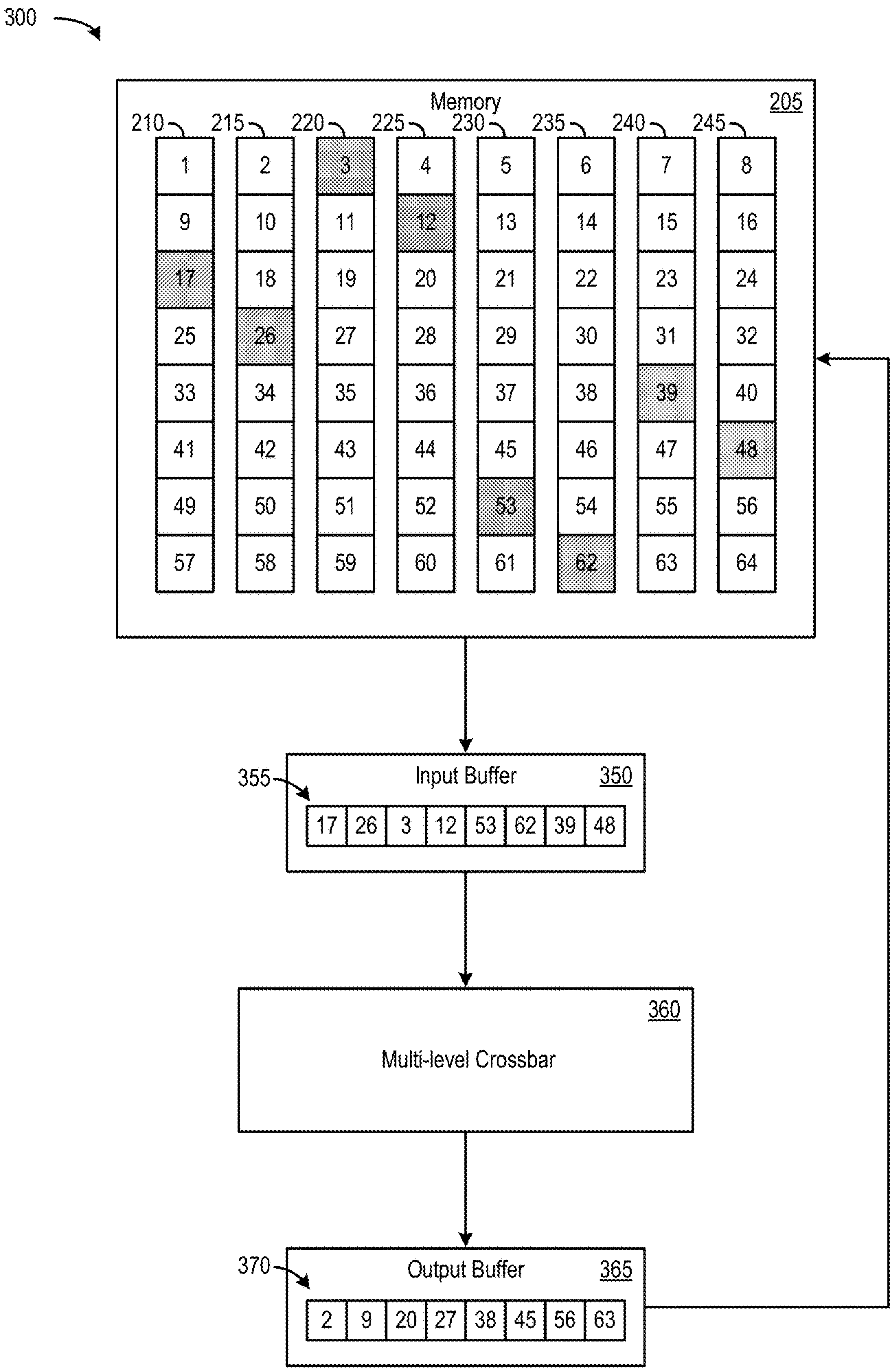

FIG. 3C illustrates system 300 after the first set of elements are written to memory 205 and the second set of elements are processed through multi-level crossbar 360. Output buffer 365 simultaneously writes the first set of elements to memory banks 210-245 during a first write operation. In particular, output buffer 365 writes the first element in output buffer 365 to the first position in memory bank 210, the second element in output buffer 365 to the second position in memory bank 215, the third element in output buffer 365 to the third position in memory bank 220, the fourth element in output buffer 365 to the fourth position in memory bank 225, the fifth element in output buffer 365 to the fifth position in memory bank 230, the sixth element in output buffer 365 to the sixth position in memory bank 235, the seventh element in output buffer 365 to the seventh position in memory bank 240, and the eighth element in output buffer 365 to the eighth position in memory bank 245.

During the first write operation, input buffer 350 provides the second set of elements stored in memory 355 to multi-level crossbar 360. Multi-level crossbar 360 is then configured to shuffle the second set of elements into their correct transposed positions and provide the transposed second set of elements to memory 370 of output buffer 365. Here, multi-level crossbar 360 is configured to swap the first and second elements, swap the third and fourth elements, swap the fifth and sixth elements, and swap the seventh and eighth elements, as shown in FIG. 3C.

While multi-level crossbar 360 transposes the second set of elements and outputs them to memory 370, input buffer 350 simultaneously retrieves a third set of elements from memory banks 210-245 during a third read operation. As illustrated in FIG. 3C, input buffer 350 retrieves the third element in memory bank 210, the fourth element in memory bank 215, the first element in memory bank 220, the second element in memory bank 225, the seventh element in memory bank 230, the eighth element in memory bank 235, the fifth element in memory bank 240, and the sixth element in memory bank 245. Next, input buffer 350 stores the retrieved data in memory 355.

Figure 3D:
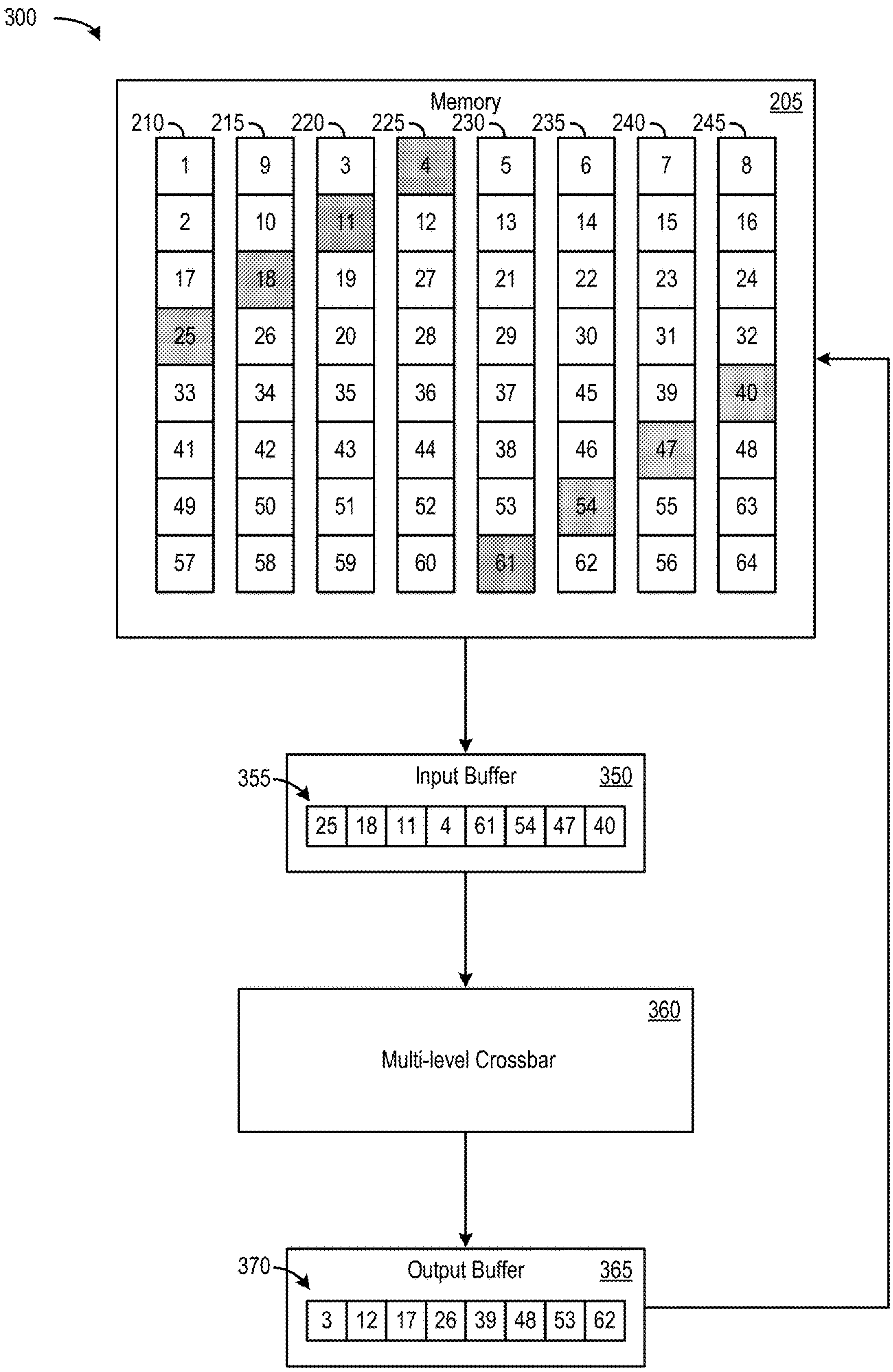

FIG. 3D illustrates system 300 after the second set of elements are written to memory 205 and the third set of elements are processed through multi-level crossbar 360. During a second write operation, output buffer 365 simultaneously writes the second set of elements to memory banks 210-245. As shown, output buffer 365 writes the first element in output buffer 365 to the second position in memory bank 210, the second element in output buffer 365 to the first position in memory bank 215, the third element in output buffer 365 to the fourth position in memory bank 220, the fourth element in output buffer 365 to the third position in memory bank 225, the fifth element in output buffer 365 to the sixth position in memory bank 230, the sixth element in output buffer 365 to the fifth position in memory bank 235, the seventh element in output buffer 365 to the eighth position in memory bank 240, and the eighth element in output buffer 365 to the seventh position in memory bank 245.

During the second write operation, input buffer 350 provides the third set of elements stored in memory 355 to multi-level crossbar 360. Next, multi-level crossbar 360 is configured to shuffle the third set of elements into their correct transposed positions and provide the transposed third set of elements to memory 370 of output buffer 365. For this example, multi-level crossbar 360 is configured to route the first element to the third position, the second element to the fourth position, the third element to the first position, the fourth element to the second position, the fifth element to the seventh position, the sixth element to the eighth position, the seventh element to the fifth position, and the eighth element to the sixth position, as depicted in FIG. 3D.

While multi-level crossbar 360 transposes the third set of elements and outputs them to memory 370, input buffer 350 performs a fourth read operation by simultaneously retrieving a fourth set of elements from memory banks 210-245. As shown, input buffer 350 retrieves the fourth element in memory bank 210, the third element in memory bank 215, the second element in memory bank 220, the first element in memory bank 225, the eighth element in memory bank 230, the seventh element in memory bank 235, the sixth element in memory bank 240, and the fifth element in memory bank 245. Input buffer 350 then stores the retrieved data in memory 355.

Figure 3E:
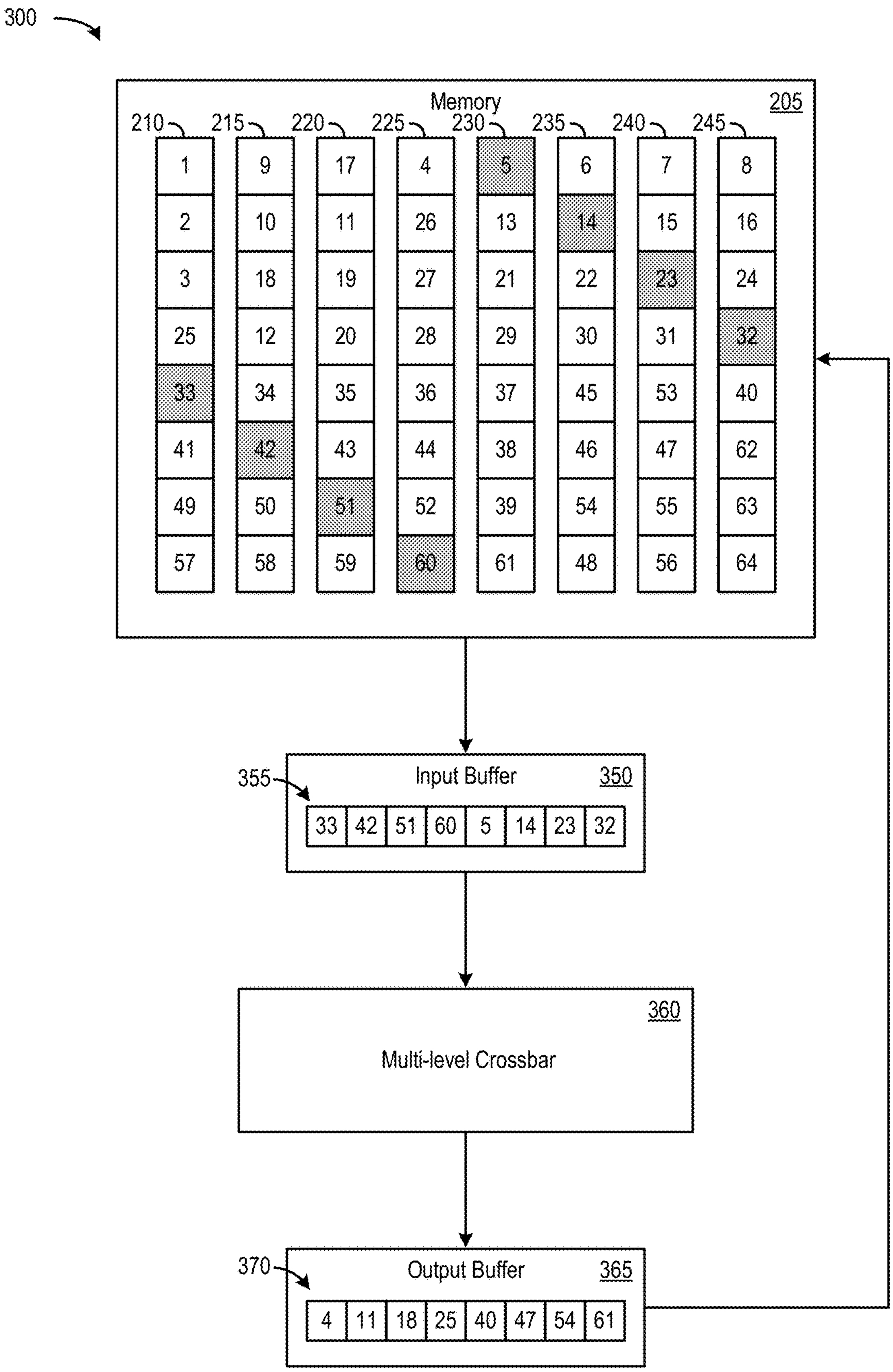

FIG. 3E illustrates system 300 after the third set of elements are written to memory 205 and the fourth set of elements are processed through multi-level crossbar 360. Output buffer 365 simultaneously writes the third set of elements to memory banks 210-245 during a third write operation. Specifically, output buffer 365 writes the first element in output buffer 365 to the third position in memory bank 210, the second element in output buffer 365 to the fourth position in memory bank 215, the third element in output buffer 365 to the first position in memory bank 220, the fourth element in output buffer 365 to the second position in memory bank 225, the fifth element in output buffer 365 to the seventh position in memory bank 230, the sixth element in output buffer 365 to the eighth position in memory bank 235, the seventh element in output buffer 365 to the fifth position in memory bank 240, and the eighth element in output buffer 365 to the sixth position in memory bank 245.

During the third write operation, input buffer 350 provides the fourth set of elements stored in memory 355 to multi-level crossbar 360. Multi-level crossbar 360 is then configured to shuffle the fourth set of elements into their correct transposed positions and provide the transposed fourth set of elements to memory 370 of output buffer 365. Here, multi-level crossbar 360 is configured to route the first element to the fourth position, the second element to the third position, the third element to the second position, the fourth element to the first position, the fifth element to the eighth position, the sixth element to the seventh position, the seventh element to the sixth position, and the eighth element to the fifth position, as shown in FIG. 3E.

While multi-level crossbar 360 transposes the fourth set of elements and outputs them to memory 370, input buffer 350 simultaneously retrieves a fifth set of elements from memory banks 210-245 during a fifth read operation. As illustrated in FIG. 3E, input buffer 350 retrieves the fifth element in memory bank 210, the sixth element in memory bank 215, the seventh element in memory bank 220, the eighth element in memory bank 225, the first element in memory bank 230, the second element in memory bank 235, the third element in memory bank 240, and the fourth element in memory bank 245. Next, input buffer 350 stores the retrieved data in memory 355.

Figure 3F:
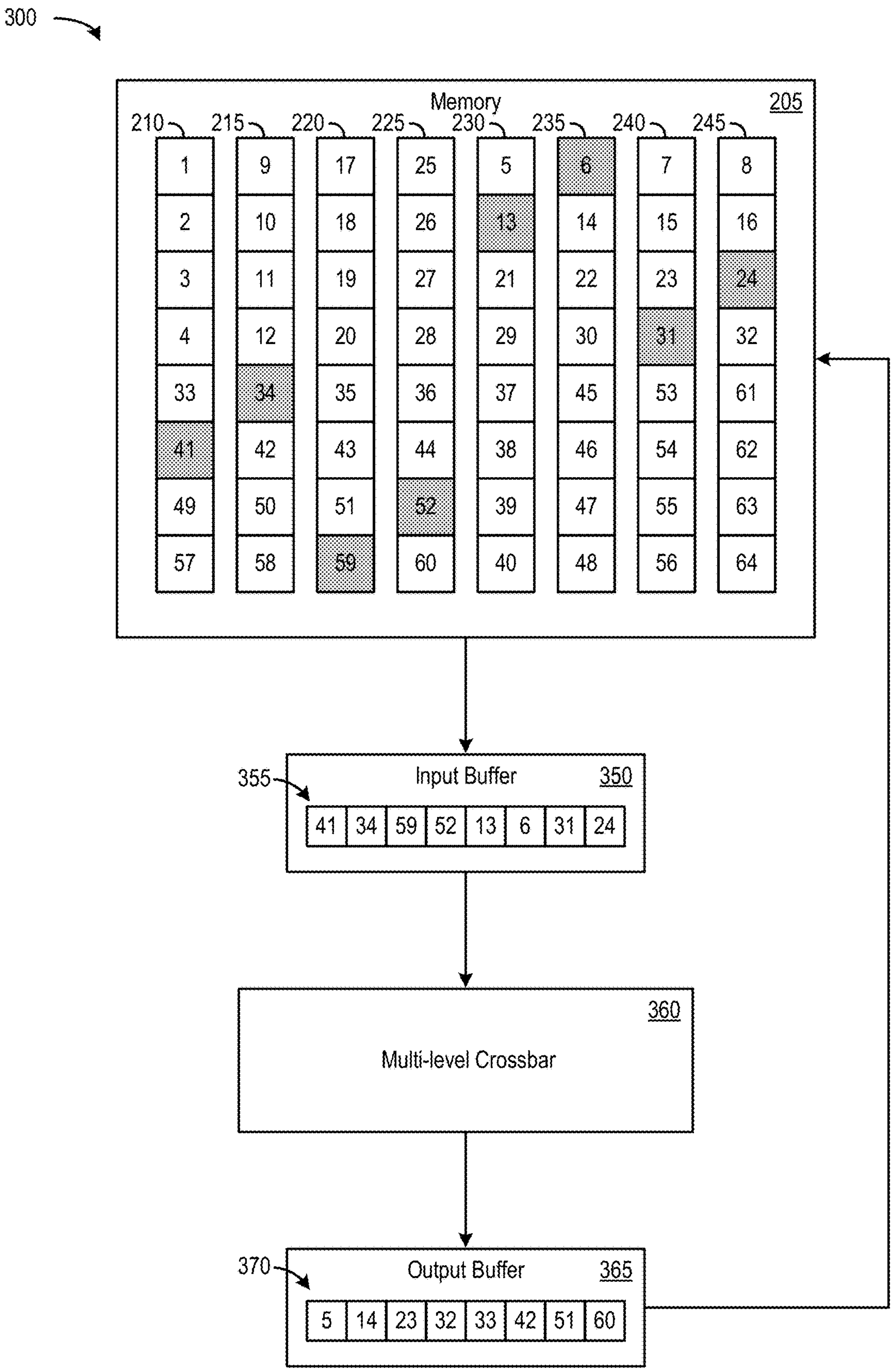

FIG. 3F illustrates system 300 after the fourth set of elements are written to memory 205 and the fifth set of elements are processed through multi-level crossbar 360. During a fourth write operation, output buffer 365 simultaneously writes the fourth set of elements to memory banks 210-245. As depicted in FIG. 3F, output buffer 365 writes the first element in output buffer 365 to the fourth position in memory bank 210, the second element in output buffer 365 to the third position in memory bank 215, the third element in output buffer 365 to the second position in memory bank 220, the fourth element in output buffer 365 to the first position in memory bank 225, the fifth element in output buffer 365 to the eighth position in memory bank 230, the sixth element in output buffer 365 to the seventh position in memory bank 235, the seventh element in output buffer 365 to the sixth position in memory bank 240, and the eighth element in output buffer 365 to the fifth position in memory bank 245.

During the fourth write operation, input buffer 350 provides the fifth set of elements stored in memory 355 to multi-level crossbar 360. Next, multi-level crossbar 360 is configured to shuffle the fifth set of elements into their correct transposed positions and provide the transposed fifth set of elements to memory 370 of output buffer 365. In this example, multi-level crossbar 360 is configured to route the first element to the fifth position, the second element to the sixth position, the third element to the seventh position, the fourth element to the eighth position, the fifth element to the first position, the sixth element to the second position, the seventh element to the third position, and the eighth element to the fourth position, as depicted in FIG. 3F.

While multi-level crossbar 360 transposes the fifth set of elements and outputs them to memory 370, input buffer 350 performs a sixth read operation by simultaneously retrieving a sixth set of elements from memory banks 210-245. As shown, input buffer 350 retrieves the sixth element in memory bank 210, the fifth element in memory bank 215, the eighth element in memory bank 220, the seventh element in memory bank 225, the second element in memory bank 230, the first element in memory bank 235, the fourth element in memory bank 240, and the third element in memory bank 245. Input buffer 350 then stores the retrieved data in memory 355.

Figure 3G:
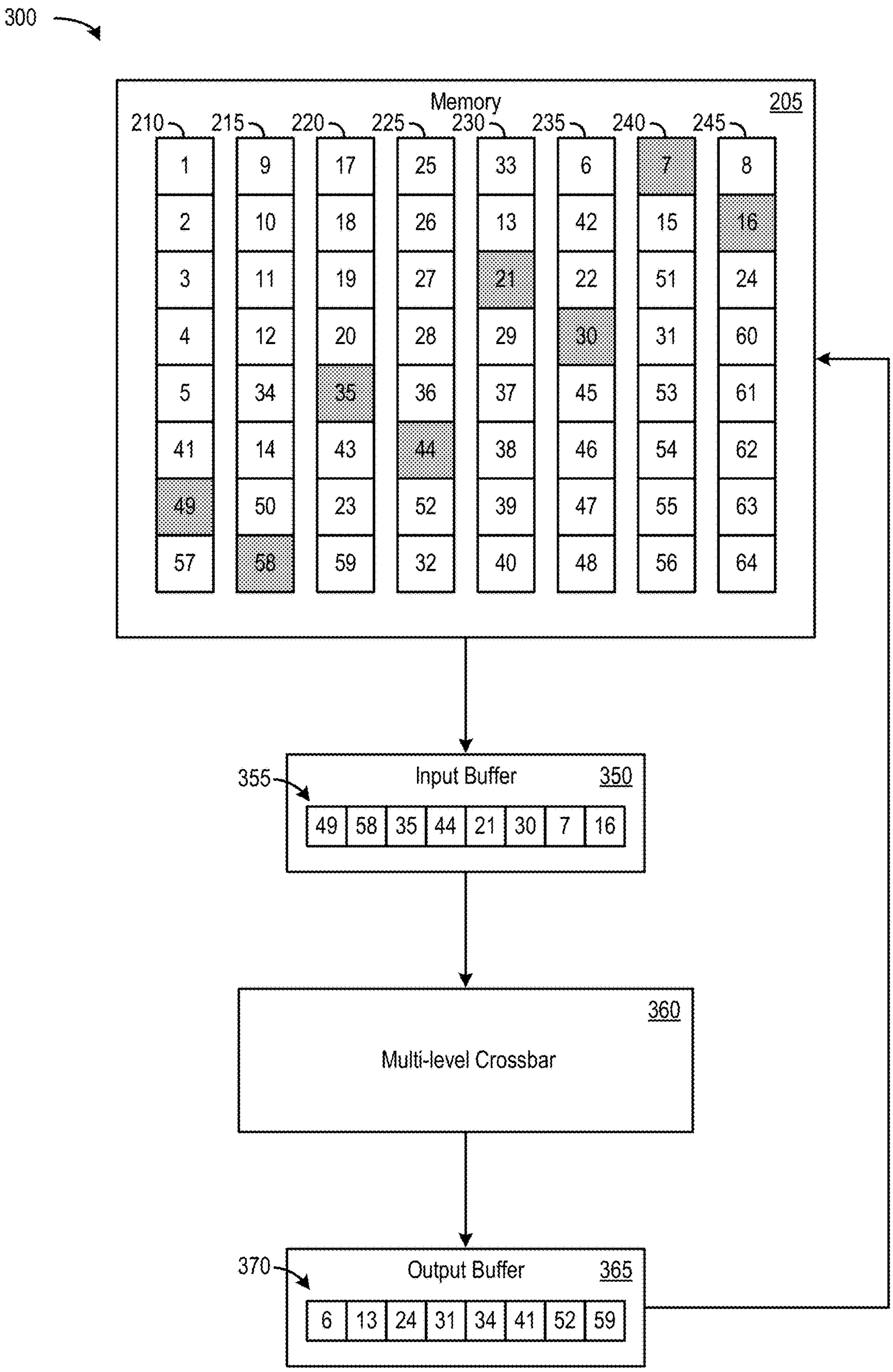

FIG. 3G illustrates system 300 after the fifth set of elements are written to memory 205 and the sixth set of elements are processed through multi-level crossbar 360. Output buffer 365 simultaneously writes the fifth set of elements to memory banks 210-245 during a fifth write operation. In particular, output buffer 365 writes the first element in output buffer 365 to the fifth position in memory bank 210, the second element in output buffer 365 to the sixth position in memory bank 215, the third element in output buffer 365 to the seventh position in memory bank 220, the fourth element in output buffer 365 to the eighth position in memory bank 225, the fifth element in output buffer 365 to the first position in memory bank 230, the sixth element in output buffer 365 to the second position in memory bank 235, the seventh element in output buffer 365 to the third position in memory bank 240, and the eighth element in output buffer 365 to the fourth position in memory bank 245.

During the fifth write operation, input buffer 350 provides the sixth set of elements stored in memory 355 to multi-level crossbar 360. Multi-level crossbar 360 is then configured to shuffle the sixth set of elements into their correct transposed positions and provide the transposed sixth set of elements to memory 370 of output buffer 365. Here, multi-level crossbar 360 is configured to route the first element to the sixth position, the second element to the fifth position, the third element to the eighth position, the fourth element to the seventh position, the fifth element to the second position, the sixth element to the first position, the seventh element to the fourth position, and the eighth element to the third position, as shown in FIG. 3G.

While multi-level crossbar 360 transposes the sixth set of elements and outputs them to memory 370, input buffer 350 simultaneously retrieves a seventh set of elements from memory banks 210-245 during a seventh read operation. As illustrated, input buffer 350 retrieves the seventh element in memory bank 210, the eighth element in memory bank 215, the fifth element in memory bank 220, the sixth element in memory bank 225, the third element in memory bank 230, the fourth element in memory bank 235, the first element in memory bank 240, and the second element in memory bank 245. Next, input buffer 350 stores the retrieved data in memory 355.

Figure 3H:
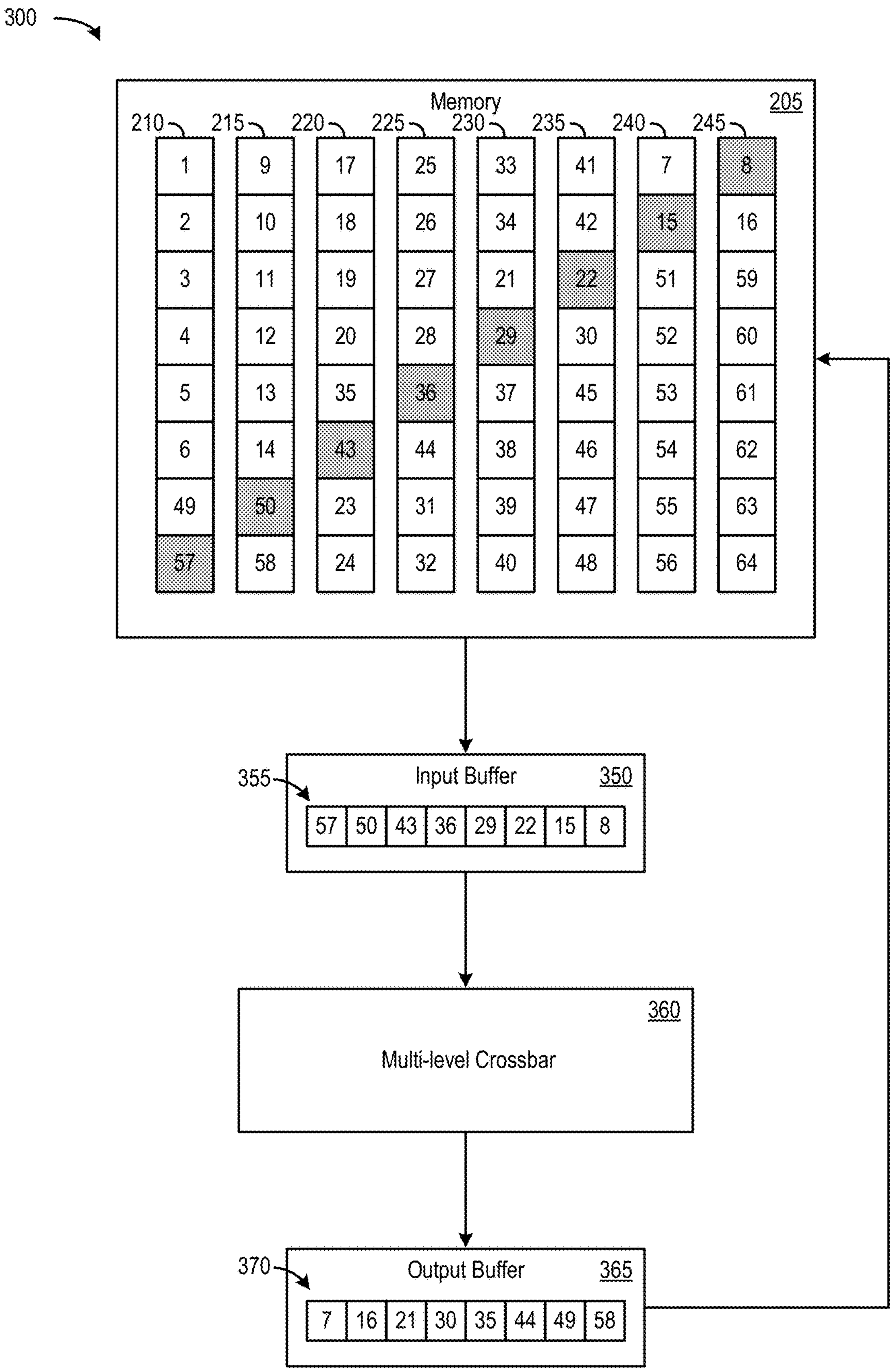

FIG. 3H illustrates system 300 after the sixth set of elements are written to memory 205 and the seventh set of elements are processed through multi-level crossbar 360. During a sixth write operation, output buffer 365 simultaneously writes the sixth set of elements to memory banks 210-245. As illustrated in FIG. 3H, output buffer 365 writes the first element in output buffer 365 to the sixth position in memory bank 210, the second element in output buffer 365 to the fifth position in memory bank 215, the third element in output buffer 365 to the eighth position in memory bank 220, the fourth element in output buffer 365 to the seventh position in memory bank 225, the fifth element in output buffer 365 to the second position in memory bank 230, the sixth element in output buffer 365 to the first position in memory bank 235, the seventh element in output buffer 365 to the fourth position in memory bank 240, and the eighth element in output buffer 365 to the third position in memory bank 245.

During the sixth write operation, input buffer 350 provides the seventh set of elements stored in memory 355 to multi-level crossbar 360. Next, multi-level crossbar 360 is configured to shuffle the seventh set of elements into their correct transposed positions and provide the transposed seventh set of elements to memory 370 of output buffer 365. Here, multi-level crossbar 360 is configured to route the first element to the seventh position, the second element to the eighth position, the third element to the fifth position, the fourth element to the sixth position, the fifth element to the third position, the sixth element to the fourth position, the seventh element to the first position, and the eighth element to the second position, as depicted in FIG. 3H.

While multi-level crossbar 360 transposes the seventh set of elements and outputs them to memory 370, input buffer 350 performs an eighth read operation by simultaneously retrieving an eighth set of elements from memory banks 210-245. As shown, input buffer 350 retrieves the eighth element in memory bank 210, the seventh element in memory bank 215, the sixth element in memory bank 220, the fifth element in memory bank 225, the fourth element in memory bank 230, the third element in memory bank 235, the second element in memory bank 240, and the first element in memory bank 245. Input buffer 350 then stores the retrieved data in memory 355.

Figure 3I:
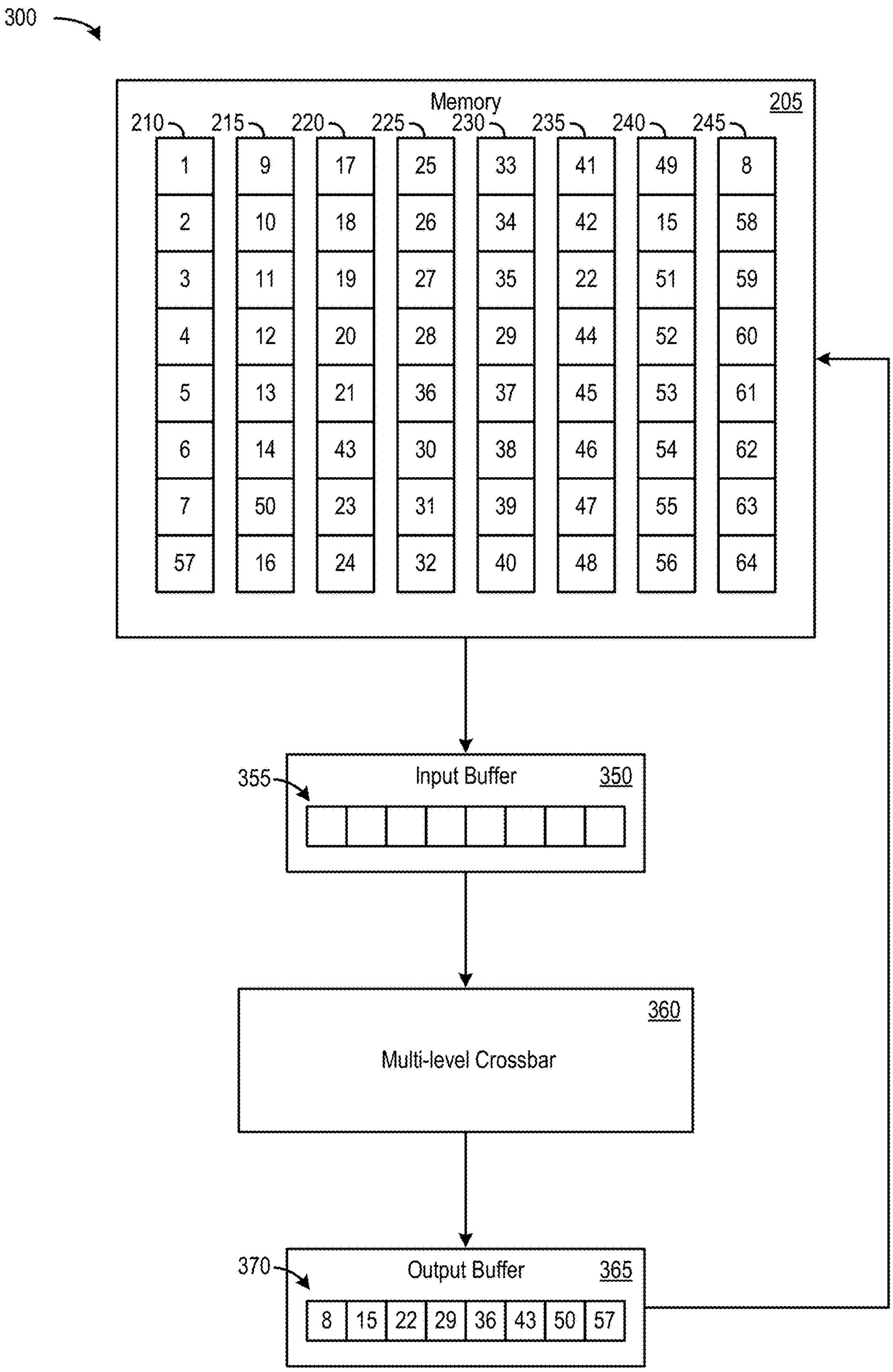

FIG. 3I illustrates system 300 after the seventh set of elements are written to memory 205 and the eighth set of elements are processed through multi-level crossbar 360. Output buffer 365 simultaneously writes the seventh set of elements to memory banks 210-245 during a seventh write operation. In particular, output buffer 365 writes the first element in output buffer 365 to the seventh position in memory bank 210, the second element in output buffer 365 to the eighth position in memory bank 215, the third element in output buffer 365 to the fifth position in memory bank 220, the fourth element in output buffer 365 to the sixth position in memory bank 225, the fifth element in output buffer 365 to the third position in memory bank 230, the sixth element in output buffer 365 to the fourth position in memory bank 235, the seventh element in output buffer 365 to the first position in memory bank 240, and the eighth element in output buffer 365 to the second position in memory bank 245.

During the seventh write operation, input buffer 350 provides the eighth set of elements stored in memory 355 to multi-level crossbar 360. Multi-level crossbar 360 is then configured to shuffle the eighth set of elements into their correct transposed positions and provide the transposed eighth set of elements to memory 370 of output buffer 365. For this example, multi-level crossbar 360 is configured to route the first element to the eighth position, the second element to the seventh position, the third element to the sixth position, the fourth element to the fifth position, the fifth element to the fourth position, the sixth element to the third position, the seventh element to the second position, and the eighth element to the first position, as shown in FIG. 3H.

Figure 3J:
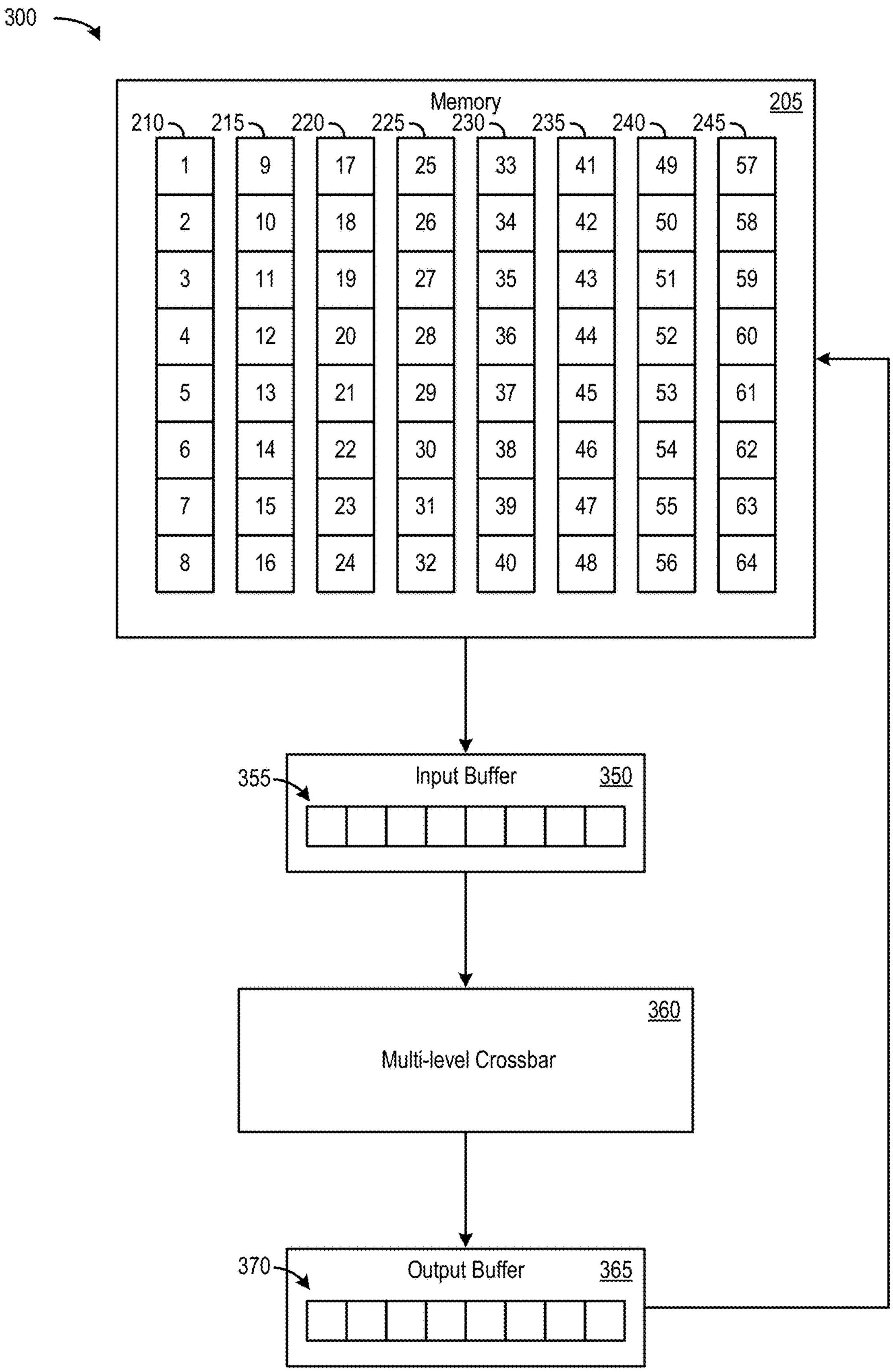

FIG. 3J illustrates system 300 after the eighth set of elements are written to memory 205. During an eighth write operation, output buffer 365 simultaneously writes the eighth set of elements to memory banks 210-245 to complete the transpose of matrix 200 in memory 205. As illustrated, output buffer 365 writes the first element in output buffer 365 to the eighth position in memory bank 210, the second element in output buffer 365 to the seventh position in memory bank 215, the third element in output buffer 365 to the sixth position in memory bank 220, the fourth element in output buffer 365 to the fifth position in memory bank 225, the fifth element in output buffer 365 to the fourth position in memory bank 230, the sixth element in output buffer 365 to the third position in memory bank 235, the seventh element in output buffer 365 to the second position in memory bank 240, and the eighth element in output buffer 365 to the first position in memory bank 245.

Figure 4:
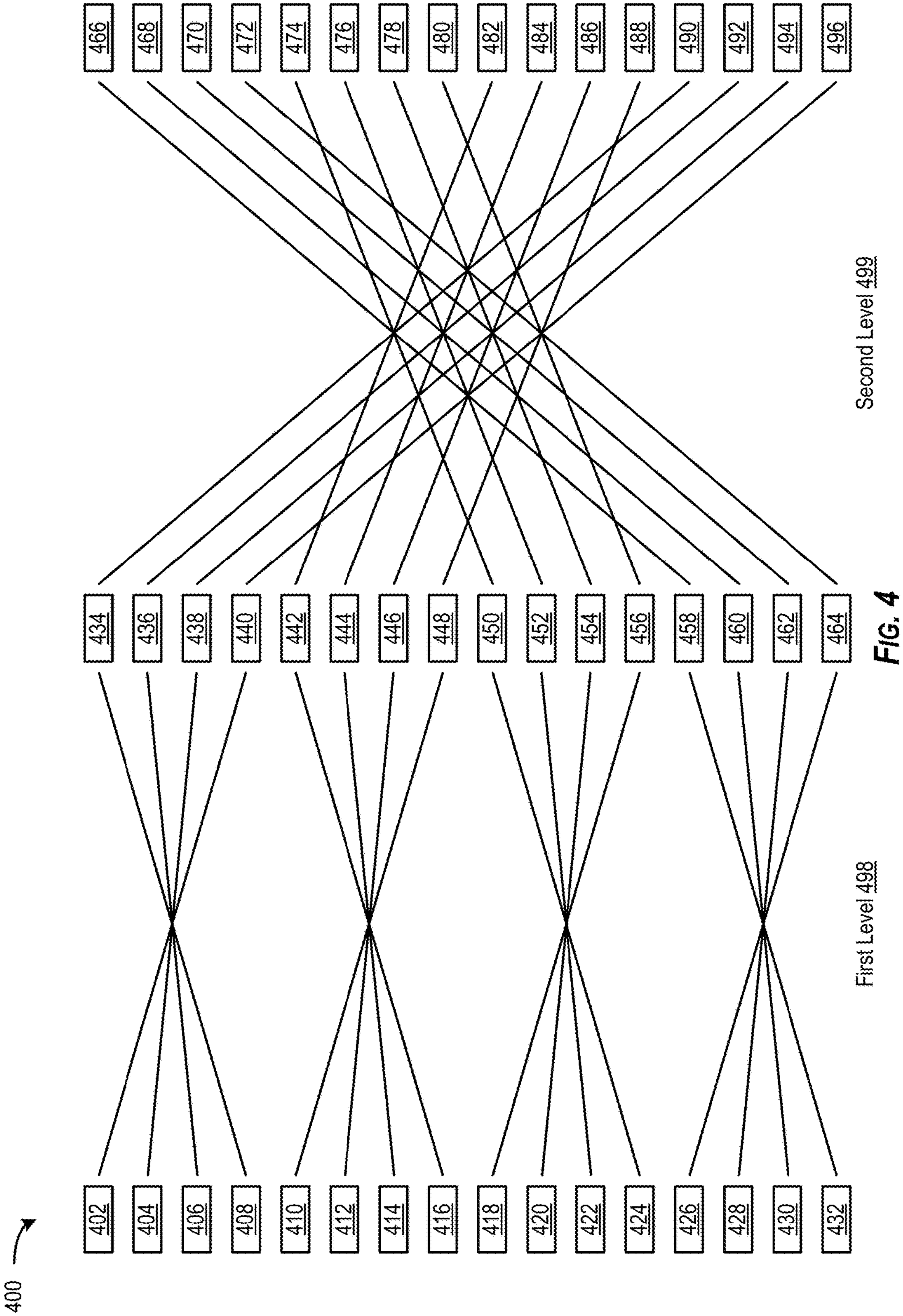
FIG. 4 illustrates an architecture of a multi-level crossbar according to some embodiments.

FIG. 4 illustrates an architecture of a multi-level crossbar 400 according to some embodiments. In some embodiments, multi-level crossbar 400 is used to implement multi-level crossbar 360. As depicted, multi-level crossbar 400 includes inputs 402-432, first level 498, first level outputs 434-464, second level 499, and second level outputs 466-496. Inputs 402-432 are the inputs of multi-level crossbar 400 and second level outputs 466-496 are the outputs of multi-level crossbar 400. Each of the inputs 402-432 can be configured forward its input to any of four of the first level outputs 434-464. In particular, each of the inputs 402-408 can be forwarded to any first level outputs 434-440, each of the inputs 410-416 can be forwarded to any first level outputs 442-448, each of the inputs 418-424 can be forwarded to any first level outputs 450-456, and each of the inputs 426-432 can be forwarded to any first level outputs 458-464. Accordingly, first level outputs 434-464 are the outputs of first level 498. In some embodiments, first level 498 is implemented using multiplexers. For example, first level 498 may be implemented using 4-to-1 multiplexers.

In addition, first level outputs 434-464 serve as the inputs to second level 499. Each of the first level outputs 434-464 may be configured forward its input to any of four of the second level outputs 466-496. Specifically, each of the inputs 434, 442, 450, and 458 can be forwarded to any second level outputs 466, 474, 482, and 490, each of the inputs 436, 444, 452, and 460 can be forwarded to any second level outputs 468, 476, 484, and 492, each of the inputs 438, 446, 454, and 462 can be forwarded to any second level outputs 470, 478, 486, and 494, and each of the inputs 440, 448, 456, and 464 can be forwarded to any second level outputs 472, 480, 488, and 496. Thus, second level outputs 466-496 are the outputs of second level 499. In some embodiments, second level 499 is implemented using multiplexers. For instance, second level 499 may be implemented using 4-to-1 multiplexers.

By interconnecting inputs 402-432 with first level outputs 434-464 and interconnecting first level outputs 434-464 with second level outputs 466-496 in this manner, each of the inputs 402-432 can be routed to any of the second level outputs 466-496. This allows multi-level crossbar 400 to perform the transpose operations described above by reference to FIGS. 2 and 3A-3J. For example, if the size of the elements in matrix 200 is the same as the size of each of the inputs 402-432, half of the inputs (e.g., inputs 402-416) can be utilized to perform the transpose operations shown in FIGS. 3A-3J. Multi-level crossbar 400 may also be used when the size of the elements in matrix 200 is different than the inputs of multi-level crossbar 400. For instance, if the size of the elements in matrix 200 is 32-bits and the size of each of the inputs 402-432 is 16-bits, multi-level crossbar 400 can handle 32-bit values by using pairs of inputs (e.g., inputs 402 and 404, inputs 406 and 408, inputs 410 and 412, etc.) to handle 32-bit values, configuring multi-level crossbar 400 to route the 32-bit values through first level 498 and second level 499, and using pairs of outputs (e.g., outputs 466 and 468, outputs 470 and 472, outputs 474 and 476, etc.) to output the shuffled 32-bit values.

Figure 5:
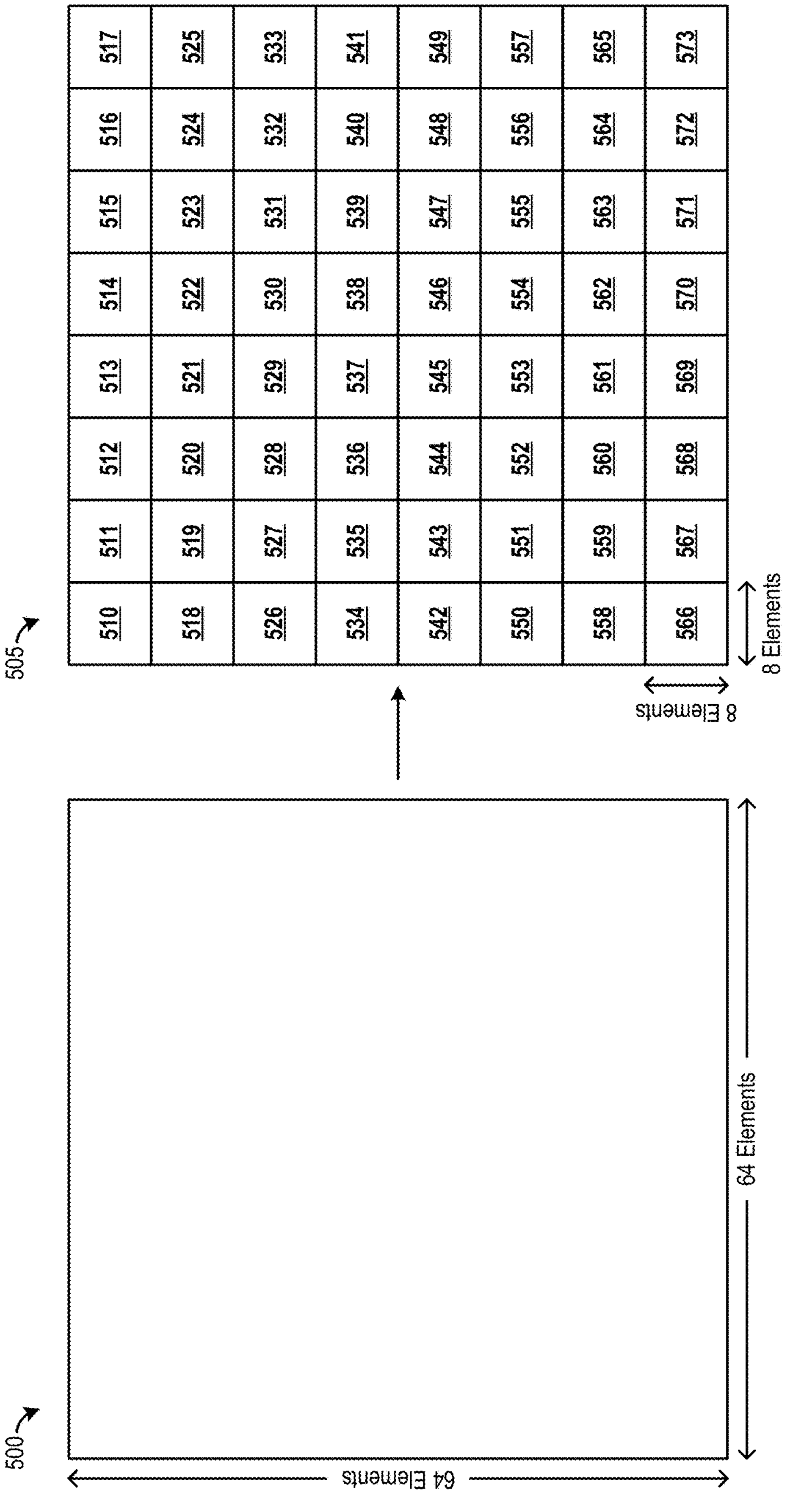
FIG. 5 illustrates an example matrix divided into submatrices according to some embodiments.

Another example transpose operation will now be described by reference to FIGS. 5-8. FIG. 5 illustrates an example matrix 500 divided into submatrices according to some embodiments. As illustrated, matrix 500 is an 64×64 matrix of elements. That is, the elements in matrix are arranged in 64 rows and 64 columns. Additionally, FIG. 5 illustrates matrix 500 divided into 64 submatrices 510-573. Each of the submatrices 510-573 is an 8×8 matrix. For this example, a system similar to system 300 is used to transpose matrix 500. However, instead of eight memory banks, the memory of the system in this example includes 32 memory banks that can be simultaneously accessed. To take advantage of the 32 memory banks, matrix 500 will be transposed by simultaneously processing groups of four submatrices. Accordingly, the input buffer, multi-level crossbar, and output buffer of the system in this example may simultaneously handle 32 elements of matrix 500.

Figure 6B:
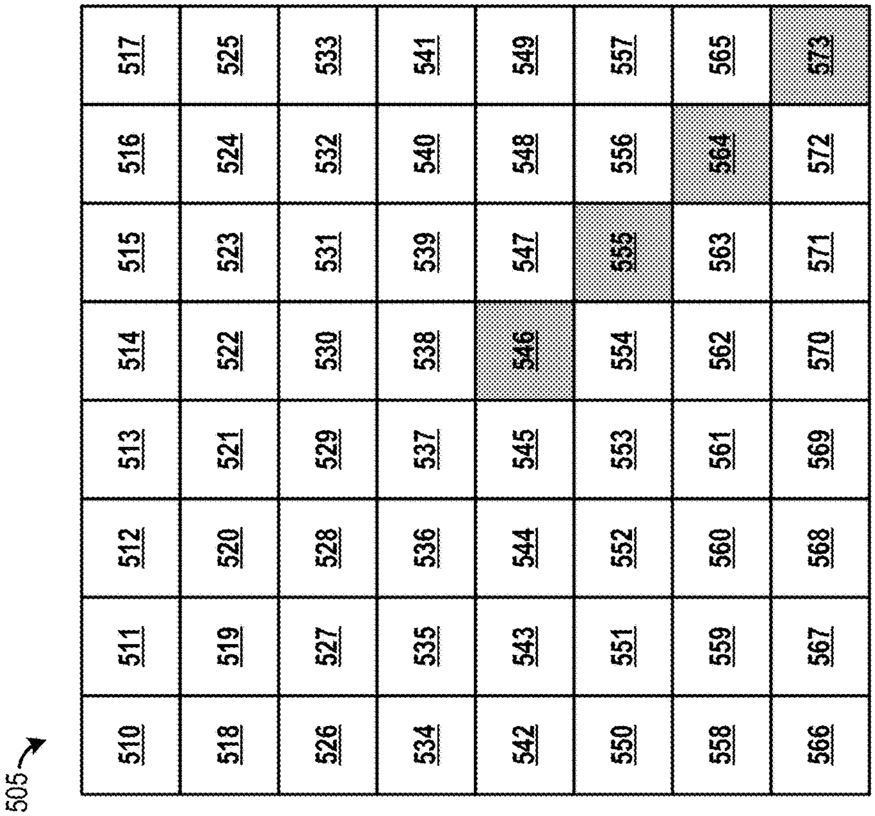
FIGS. 6A-6P illustrate an example processing pattern of submatrices for transposing the matrix illustrated in FIG. 5 according to some embodiments.
Figure 6A:
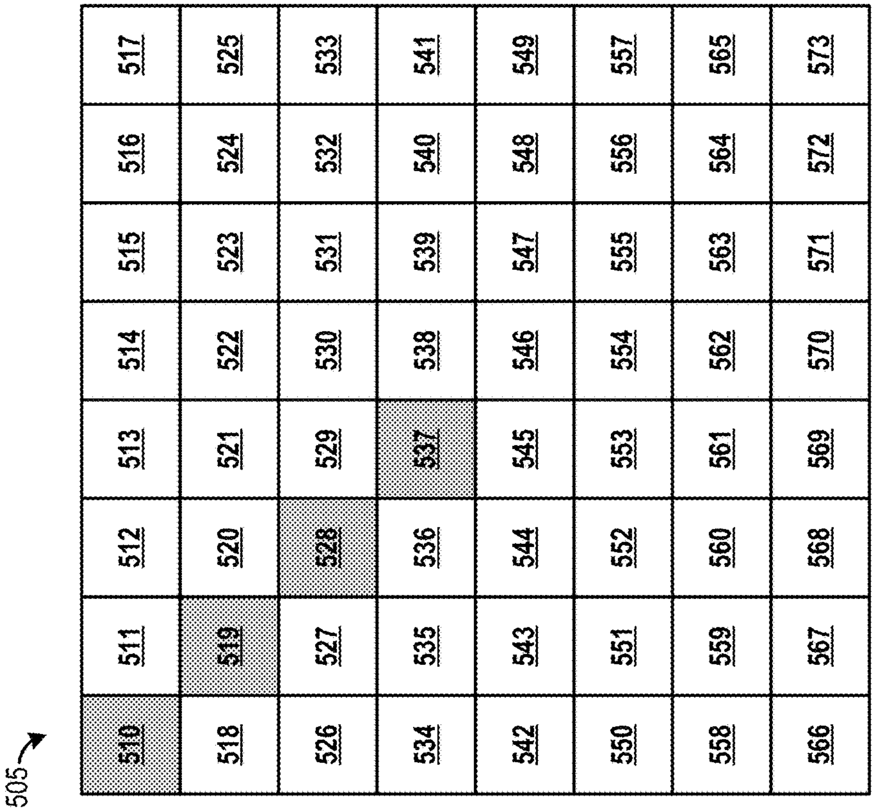
Figure 6D:
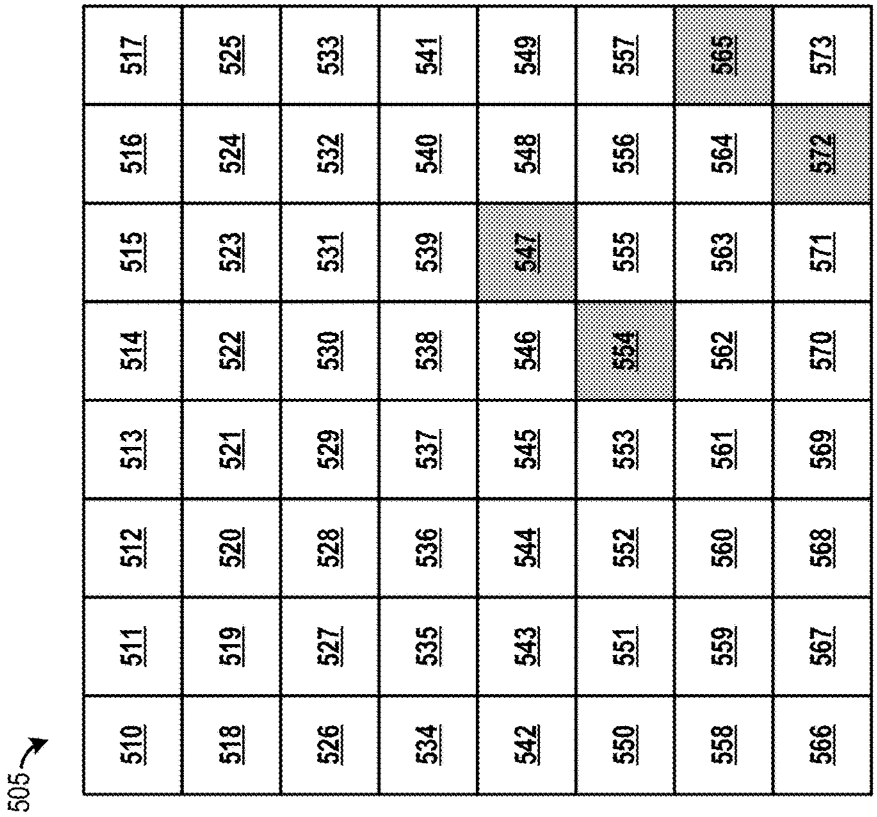
Figure 6C:
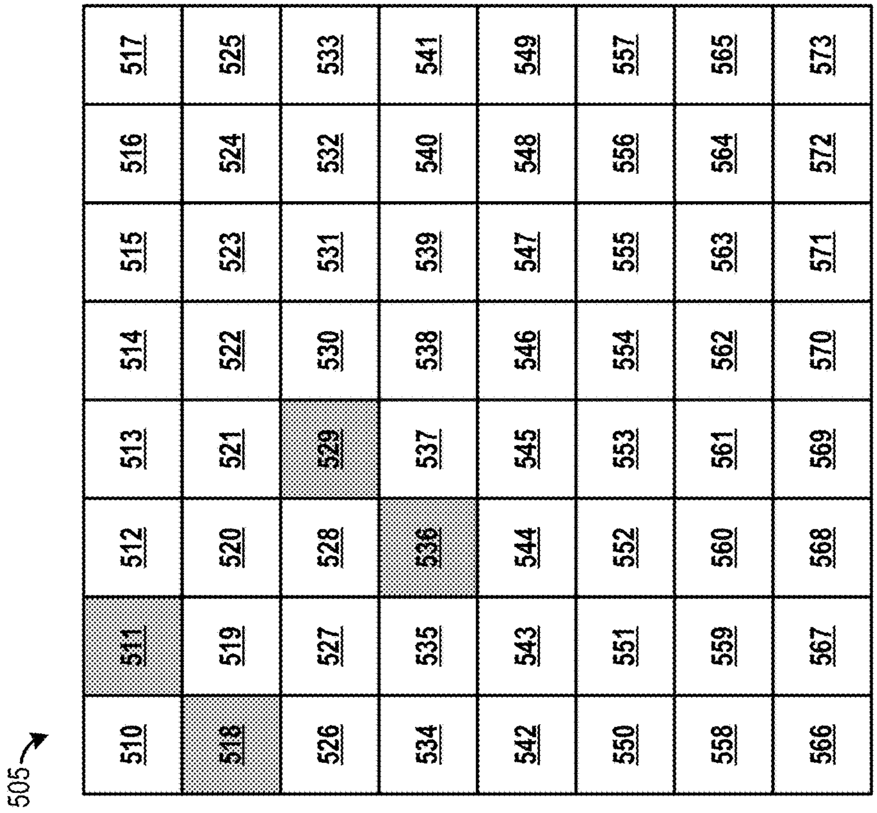
Figure 6E:
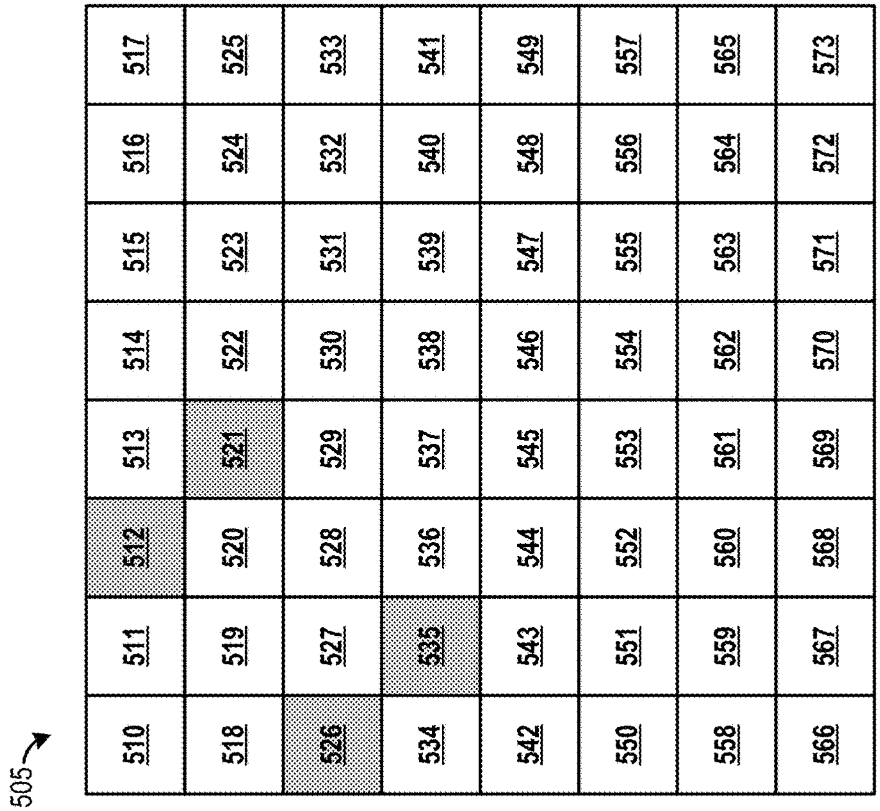
Figure 6F:
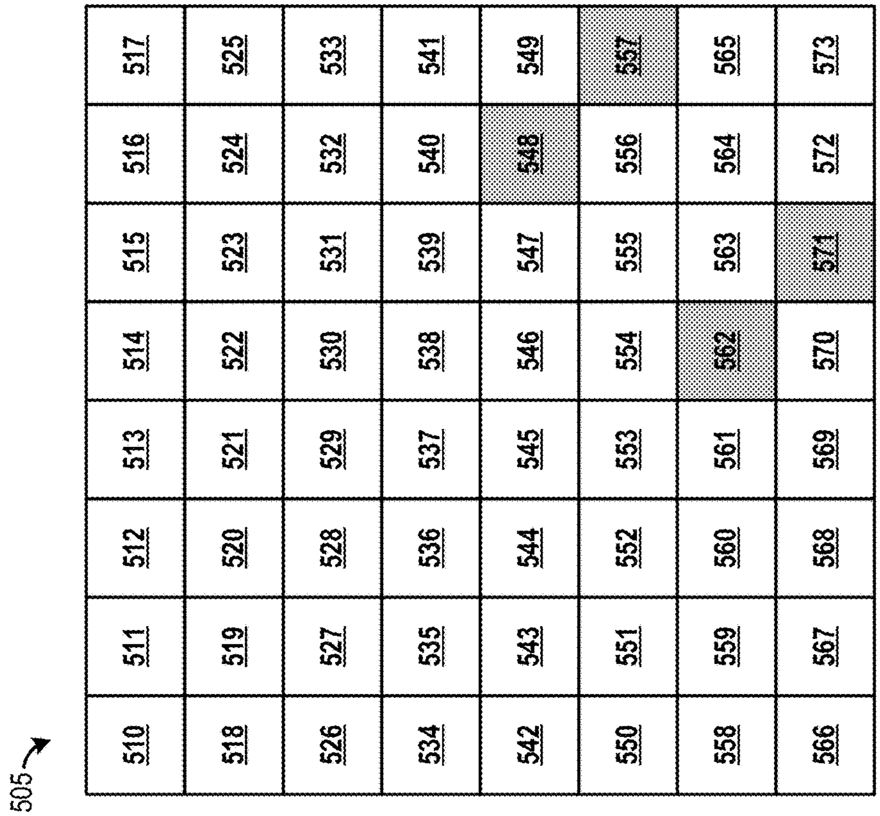
Figure 6H:
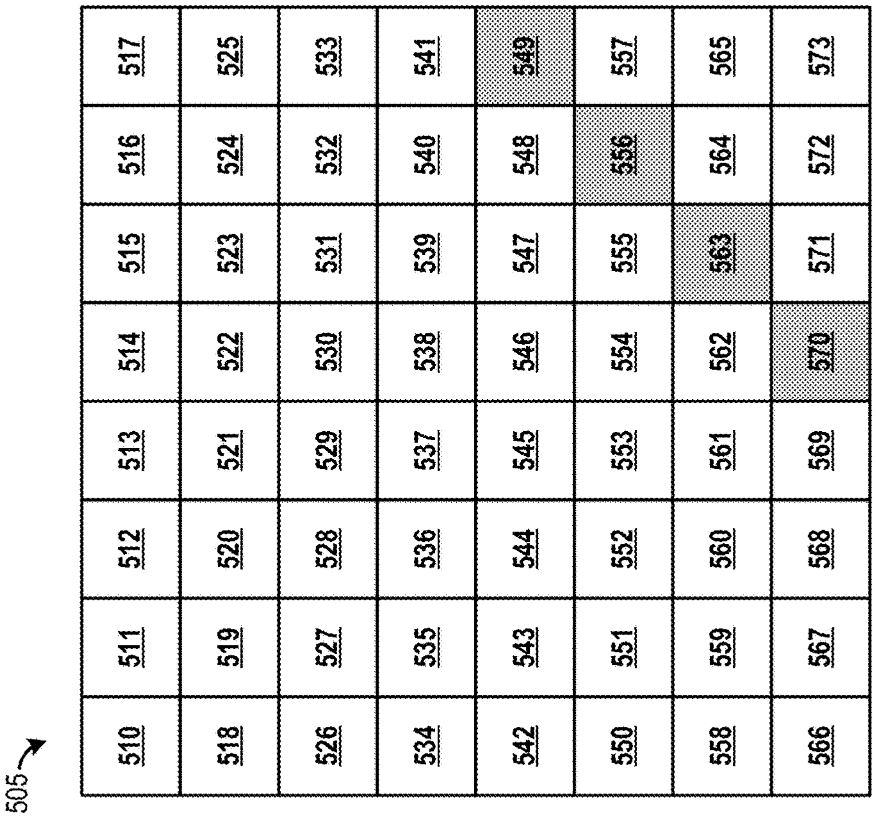
Figure 6G:
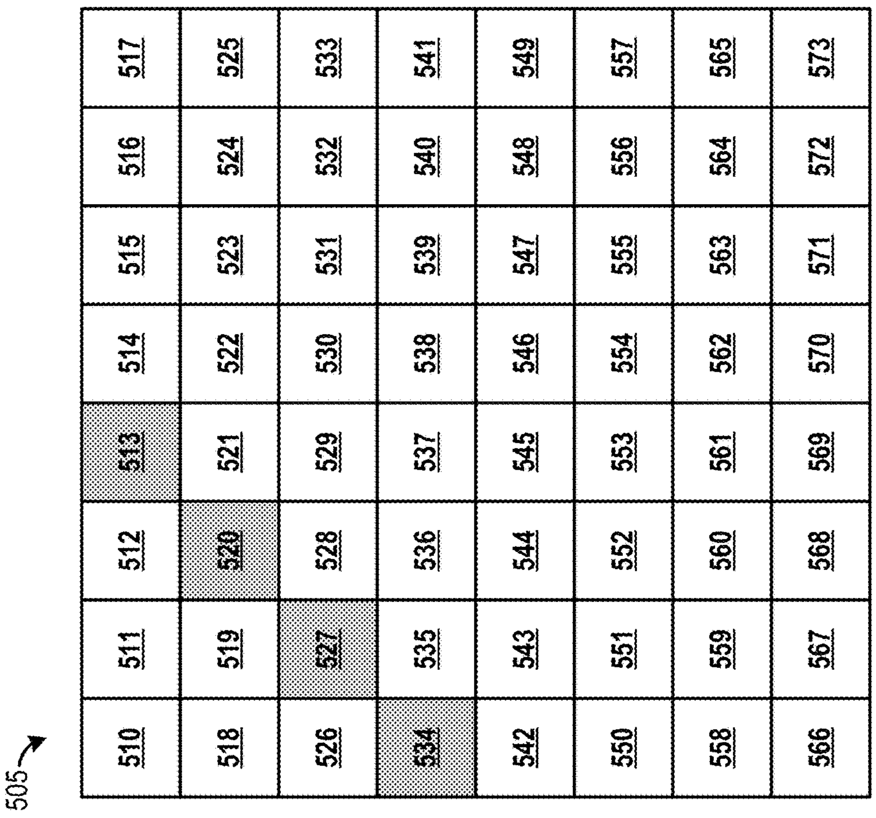
Figure 6J:
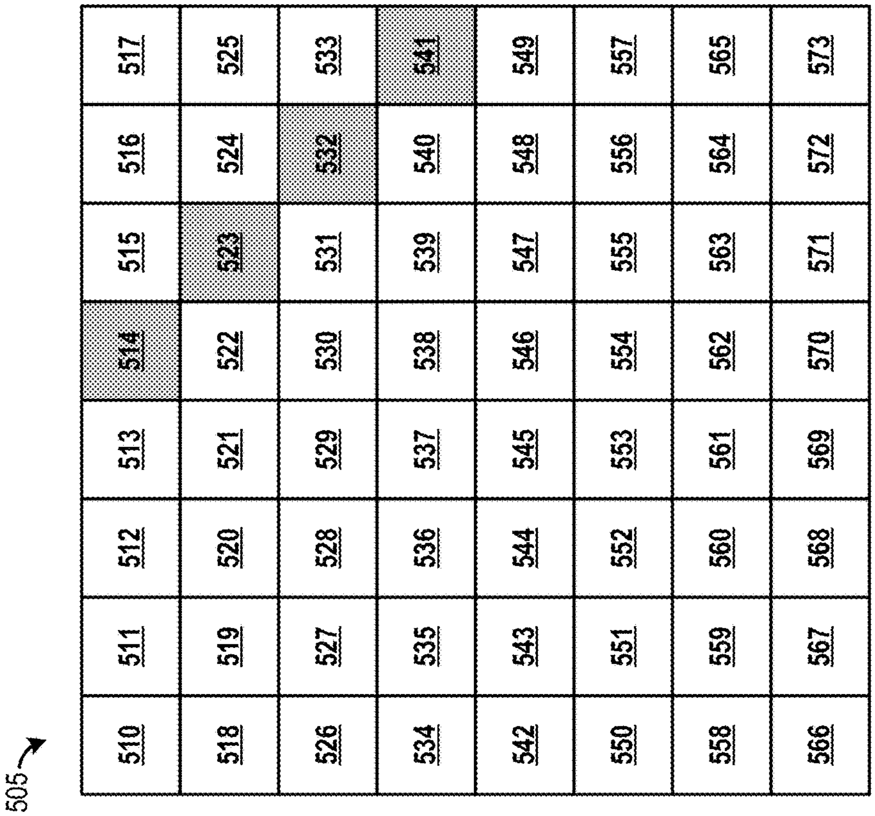
Figure 6I:
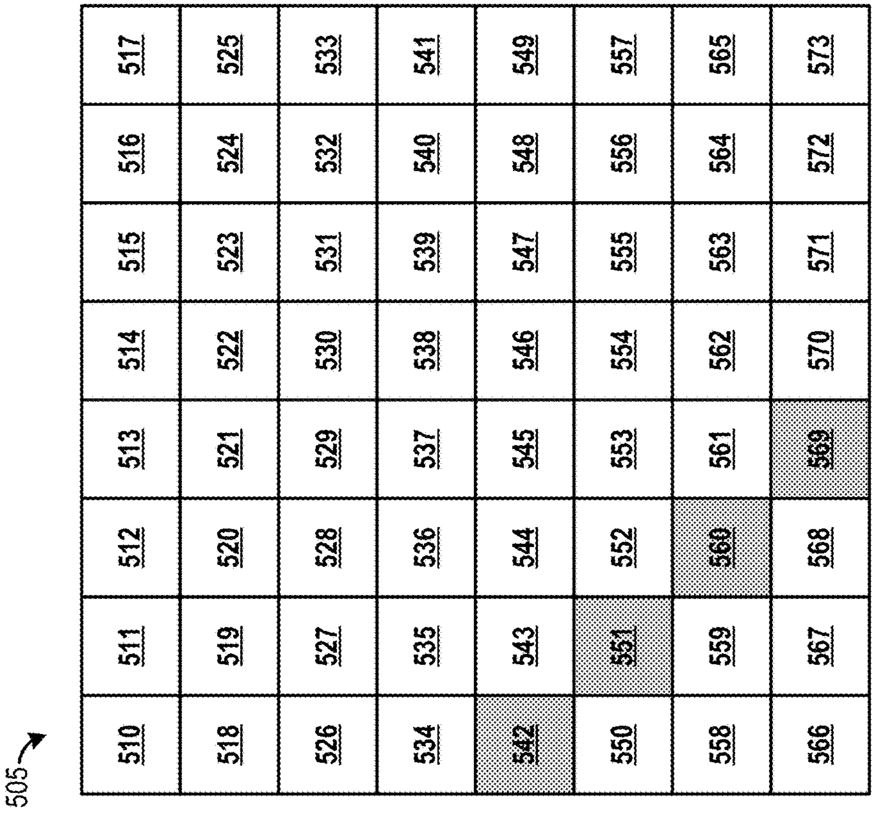
Figure 6L:
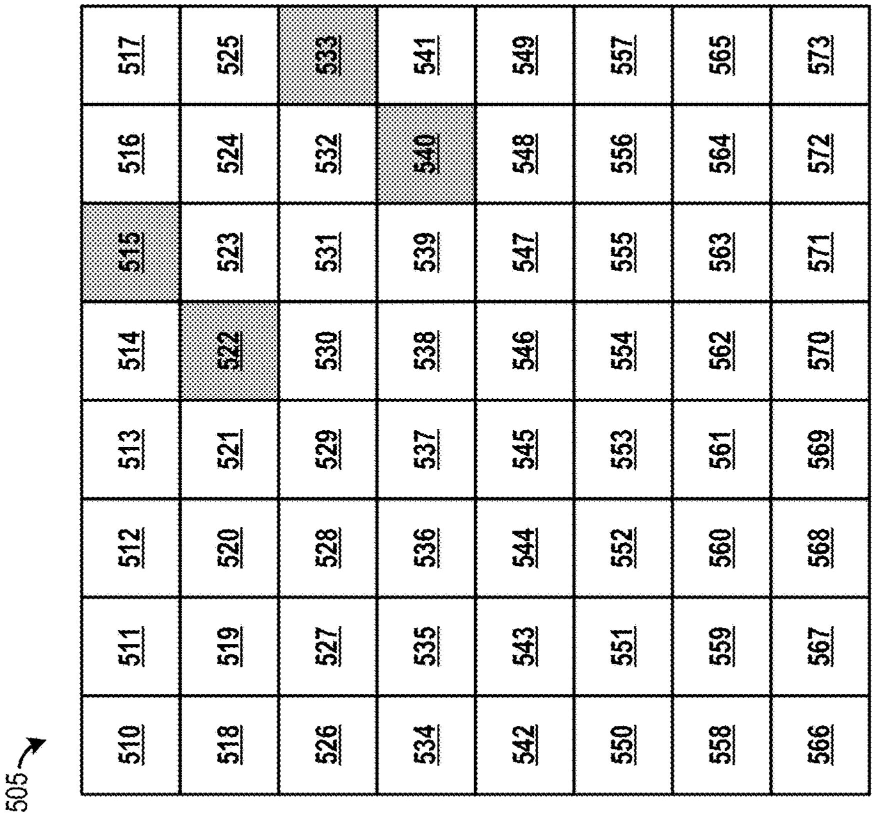
Figure 6K:
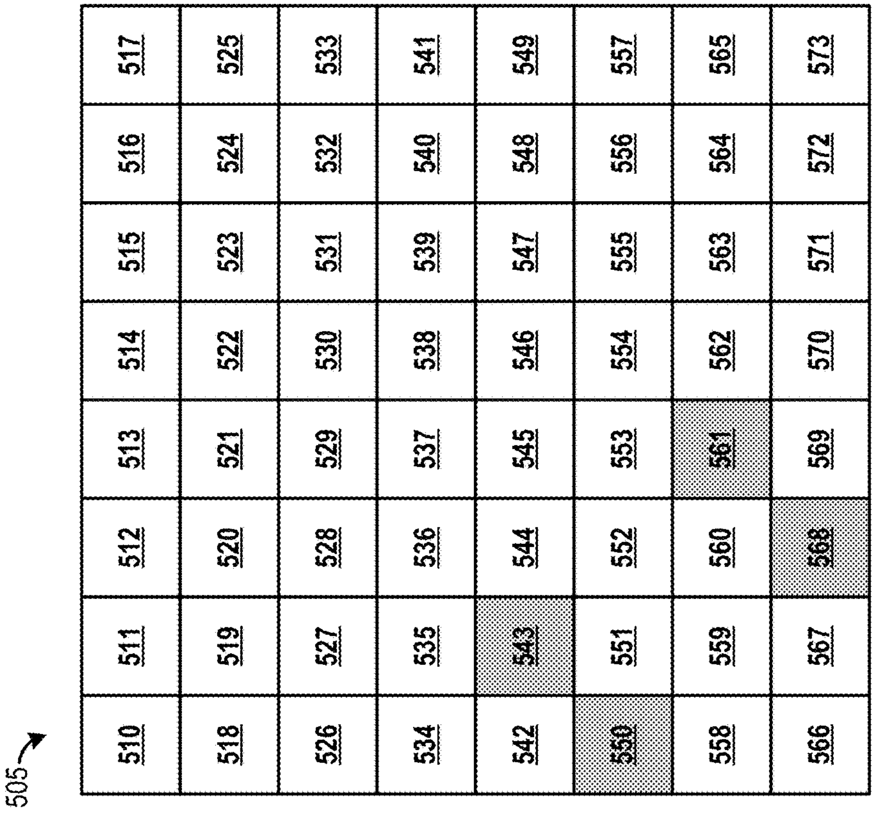
Figure 6N:
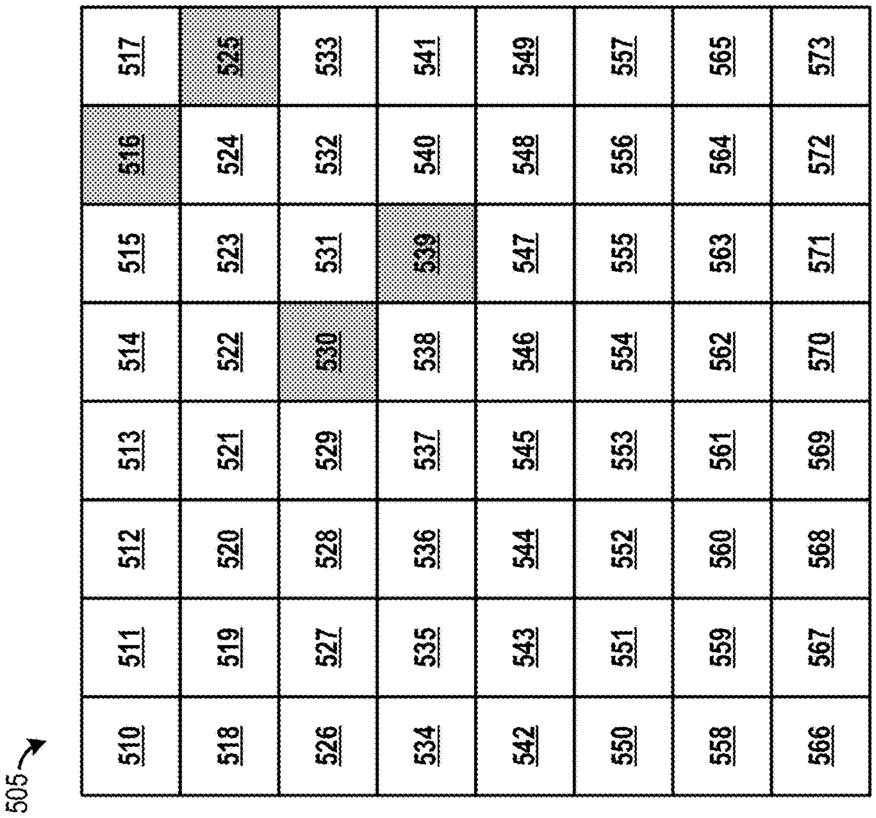
Figure 6M:
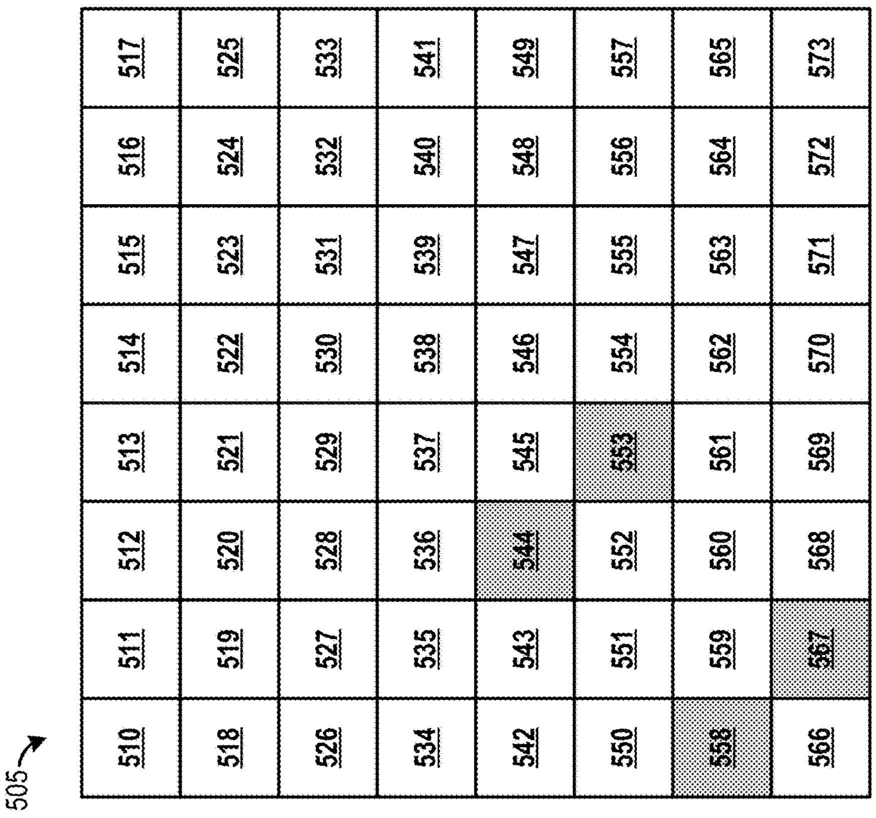
Figure 6P:
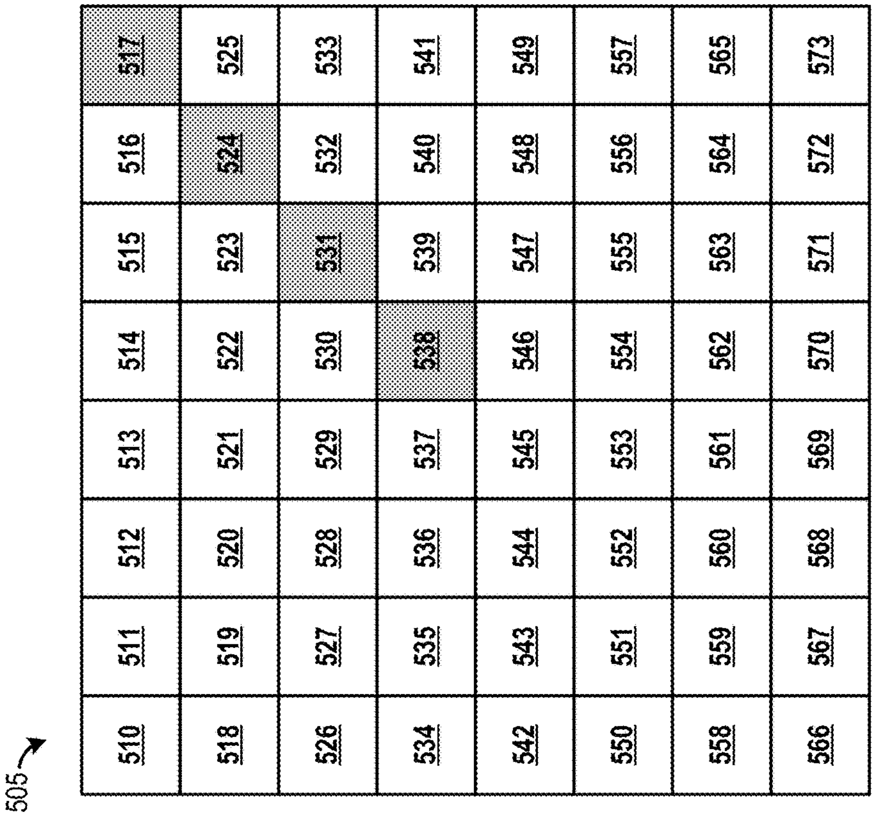
Figure 7A:
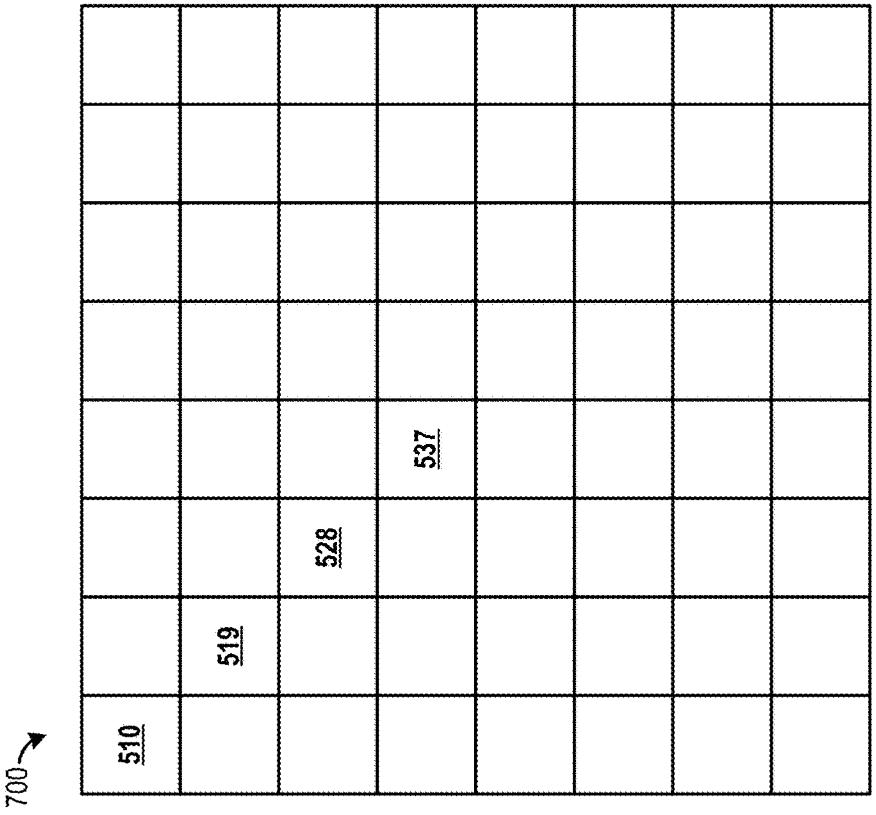
FIGS. 7A-7P illustrate the output of the processing pattern of submatrices for transposing the matrix illustrated in FIG. 5 according to some embodiments.
Figure 7B:
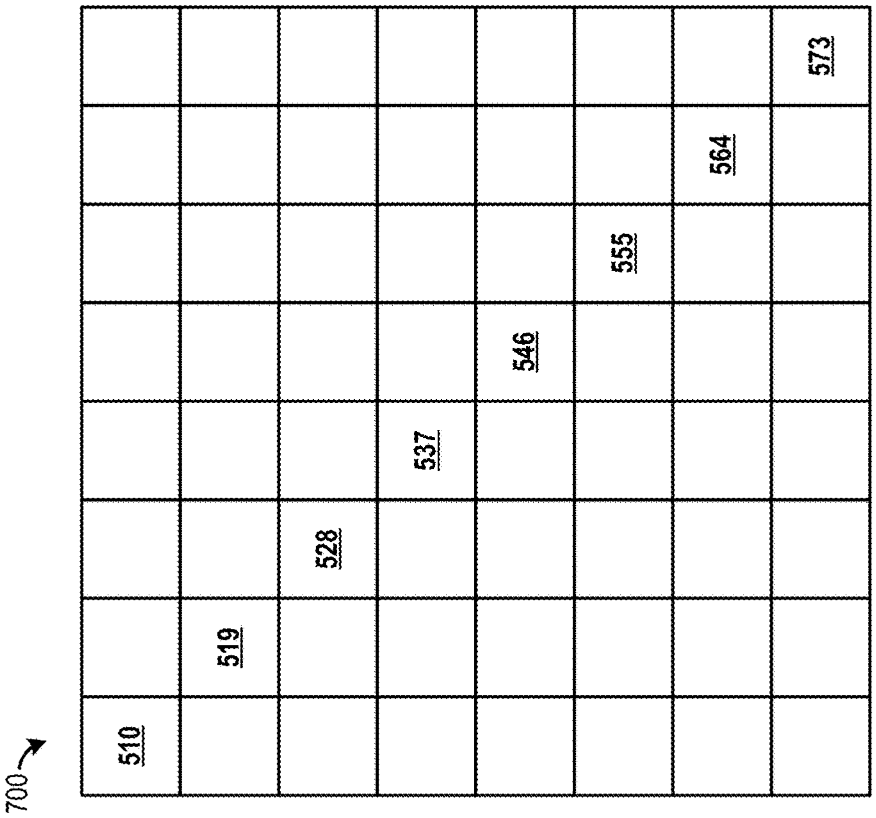
Figure 7D:
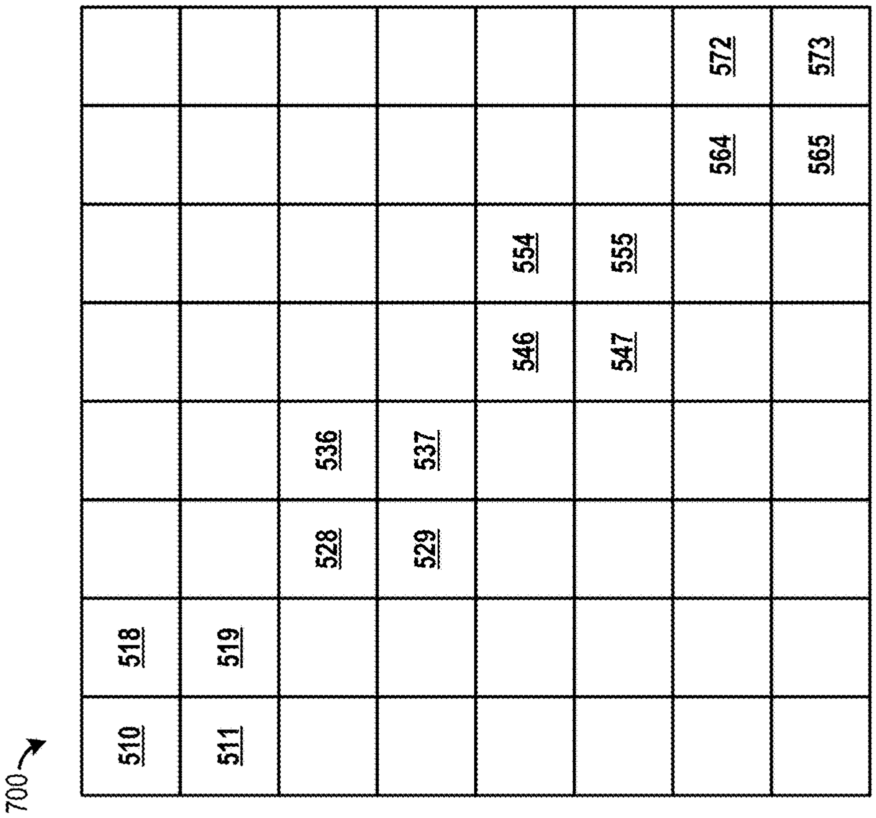
Figure 7C:
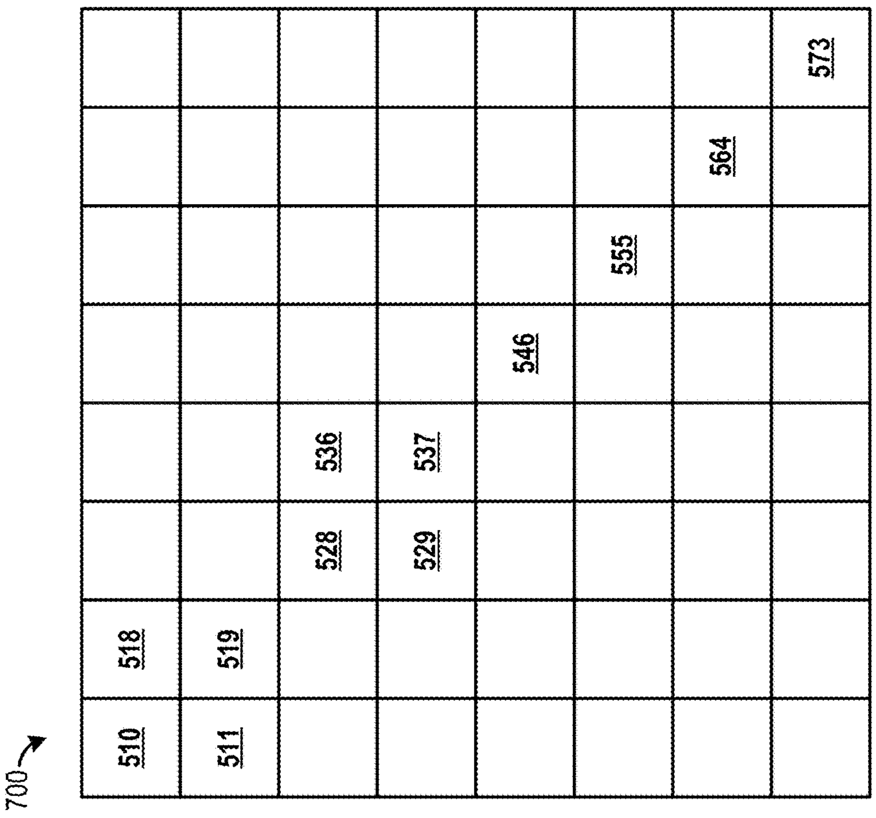
Figure 7E:
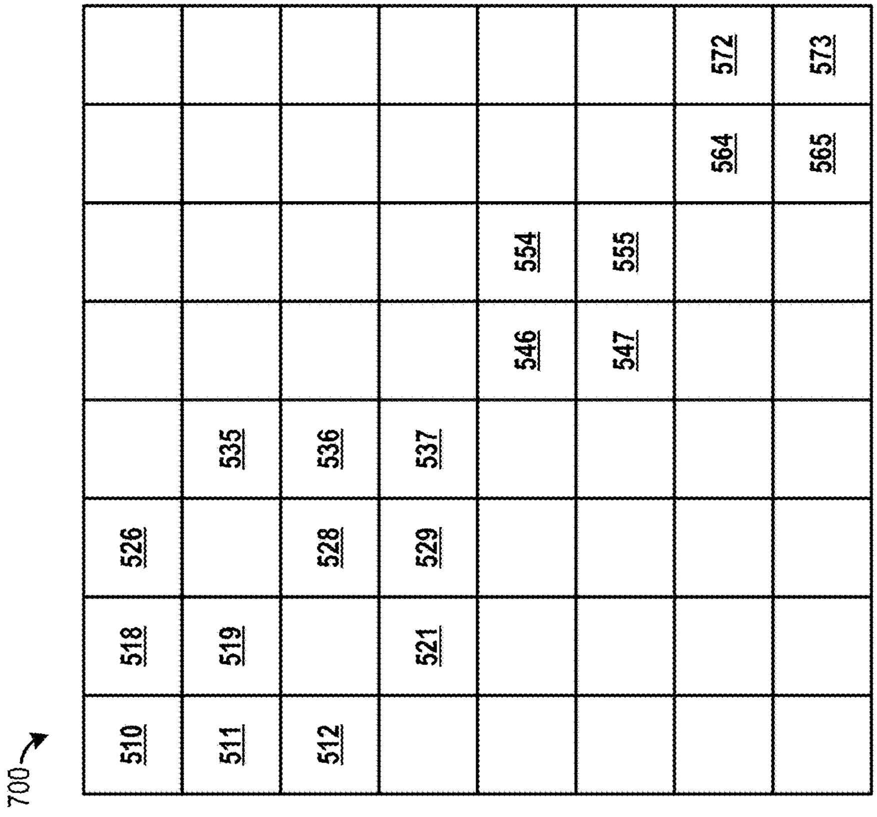
Figure 7F:
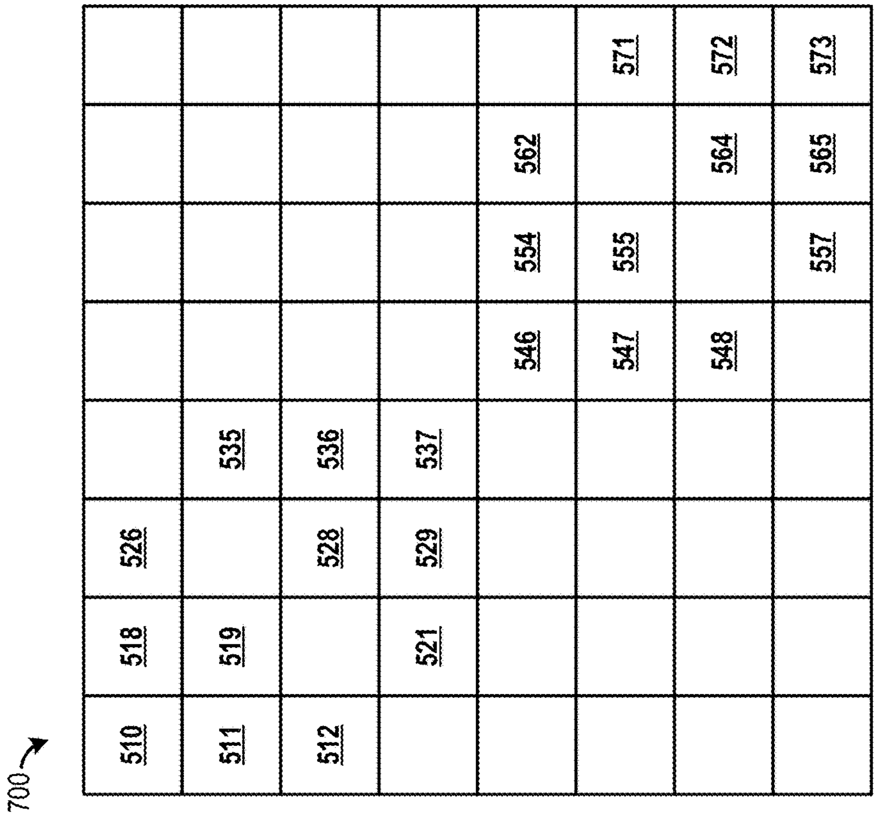
Figure 7H:
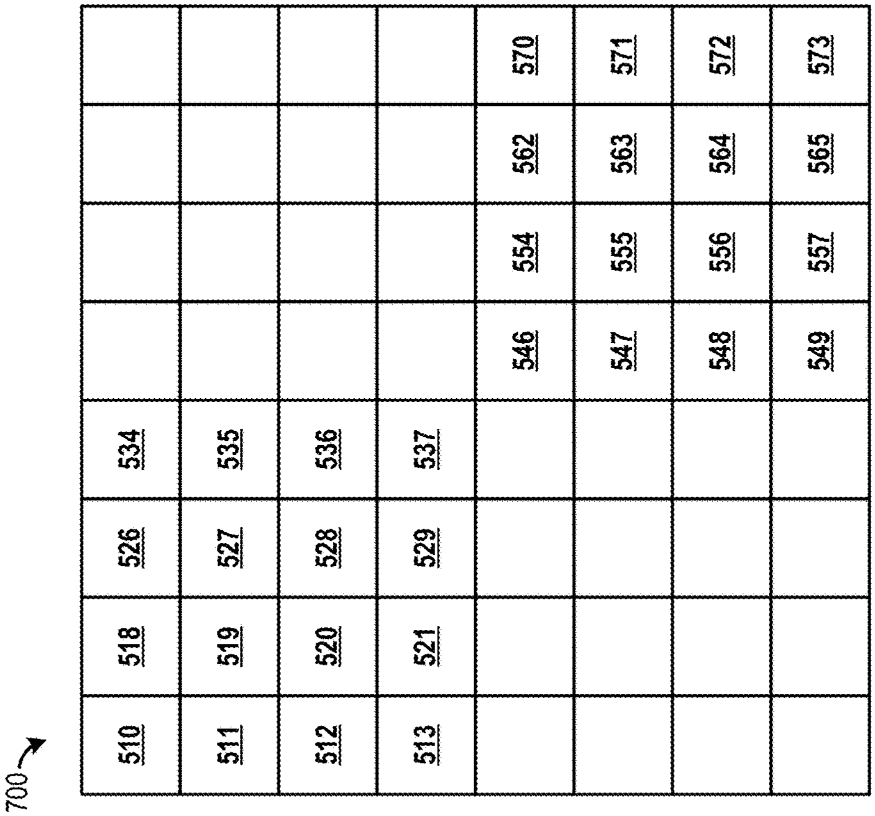
Figure 7G:
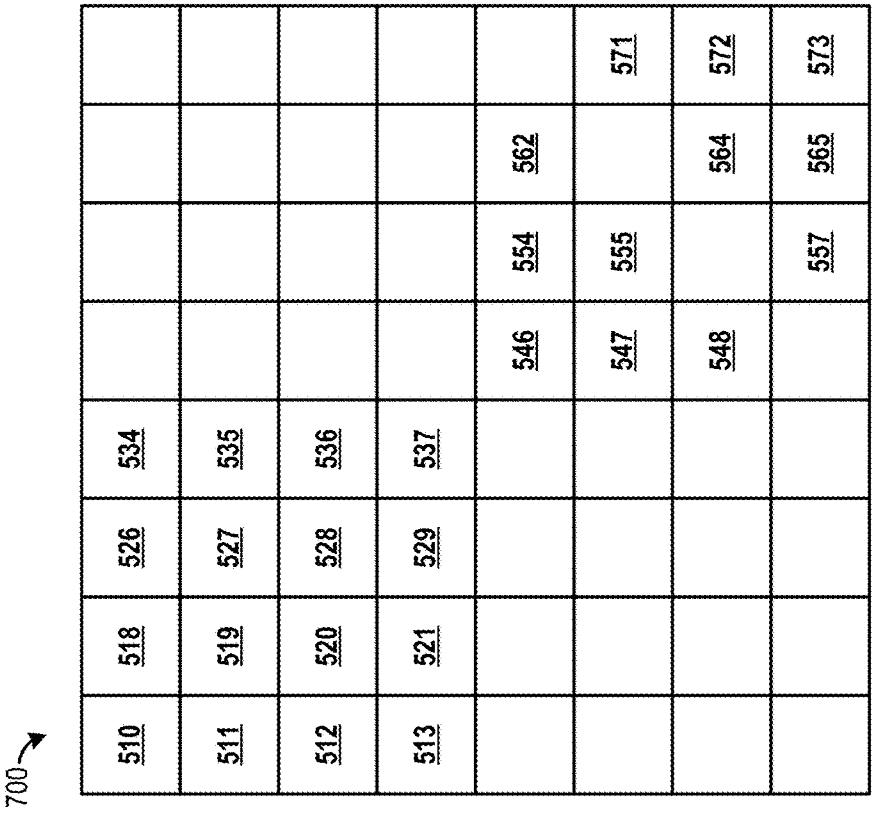
Figure 7J:
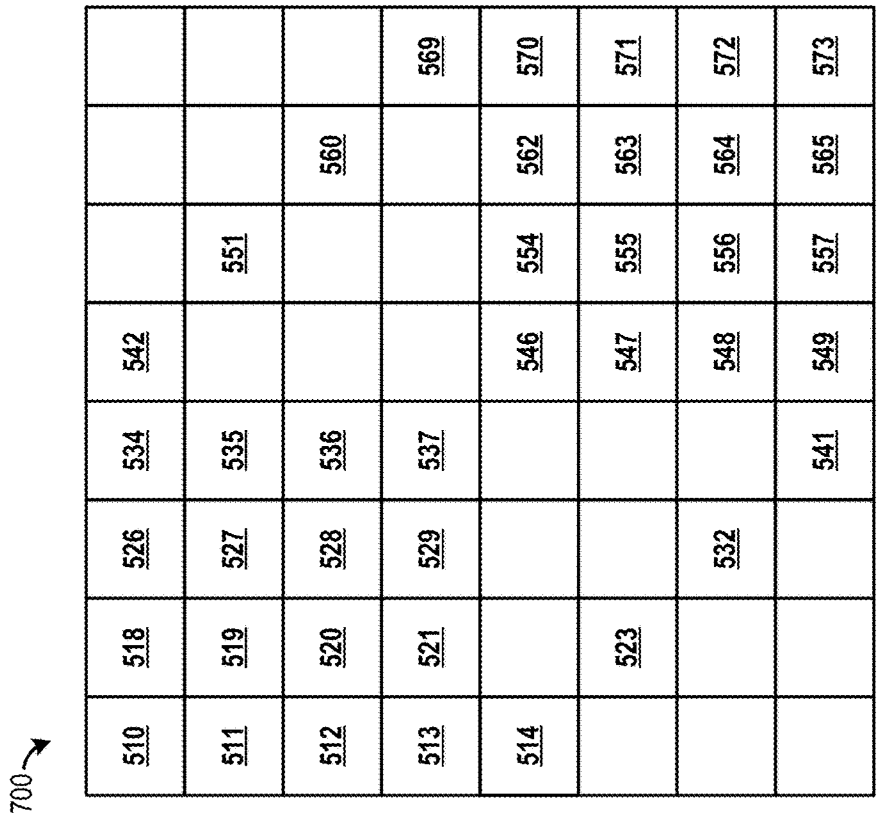
Figure 7I:
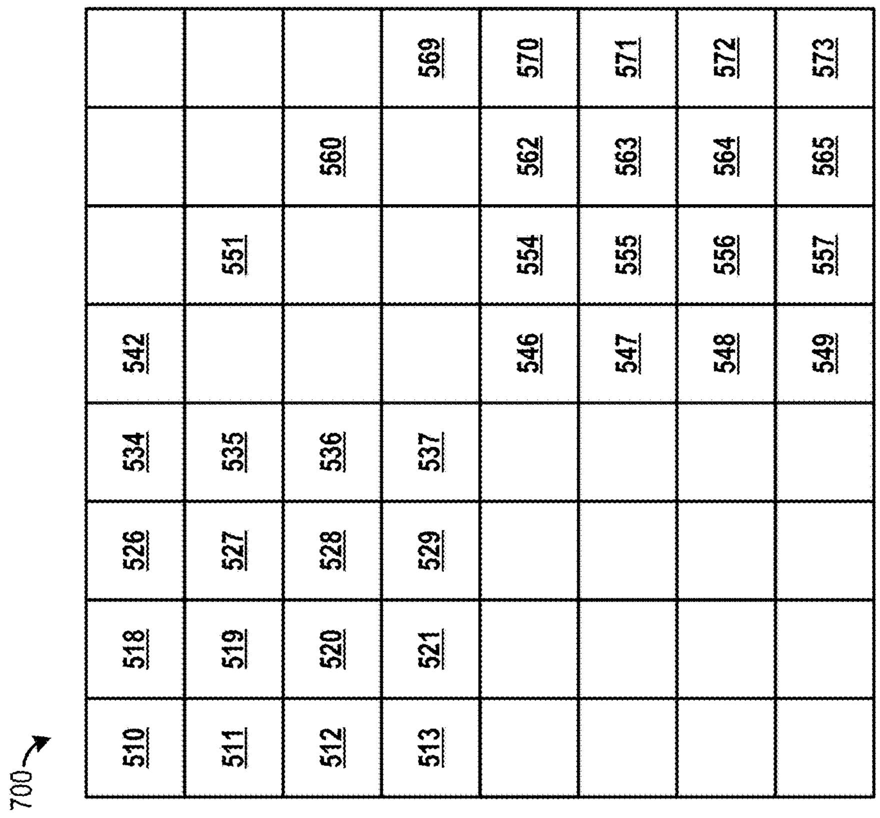
Figure 7L:
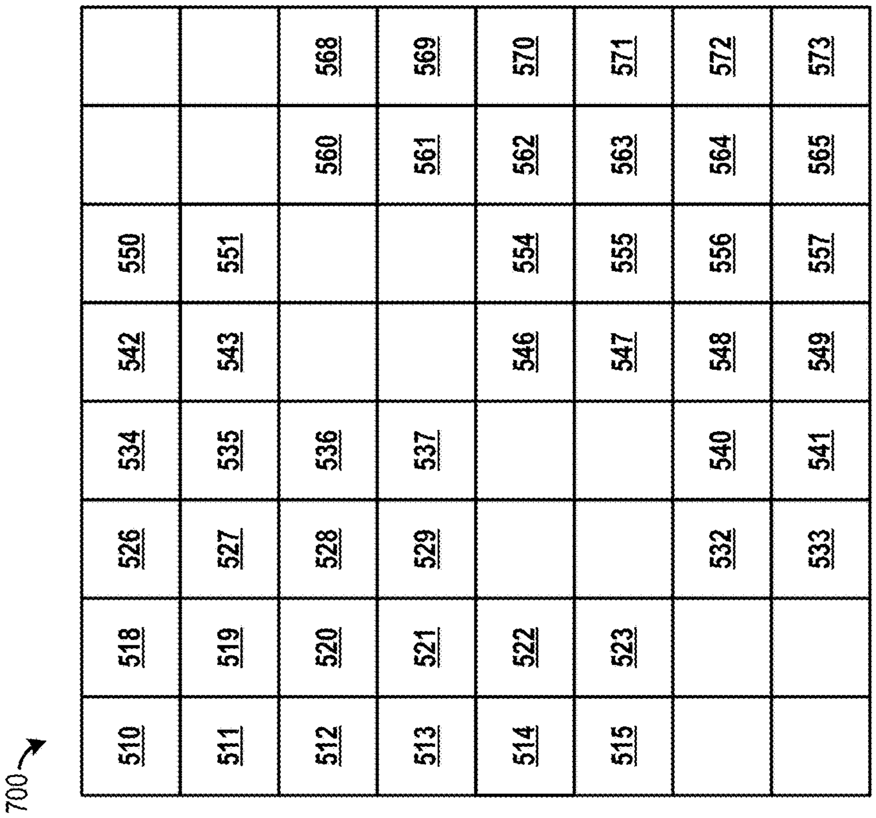
Figure 7K:
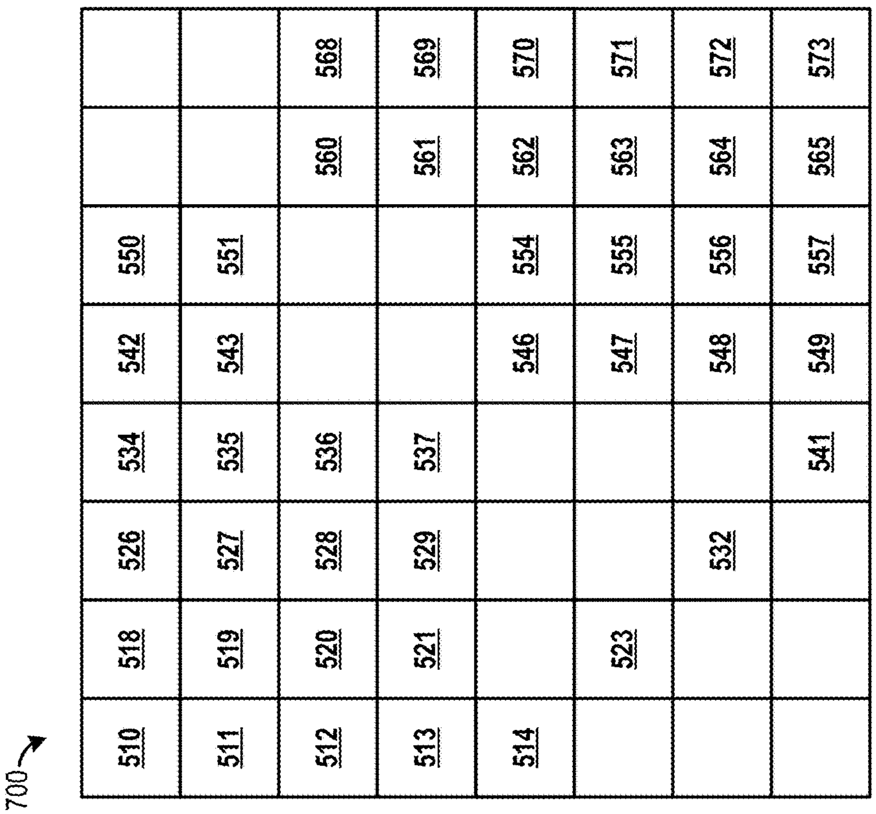
Figure 7N:
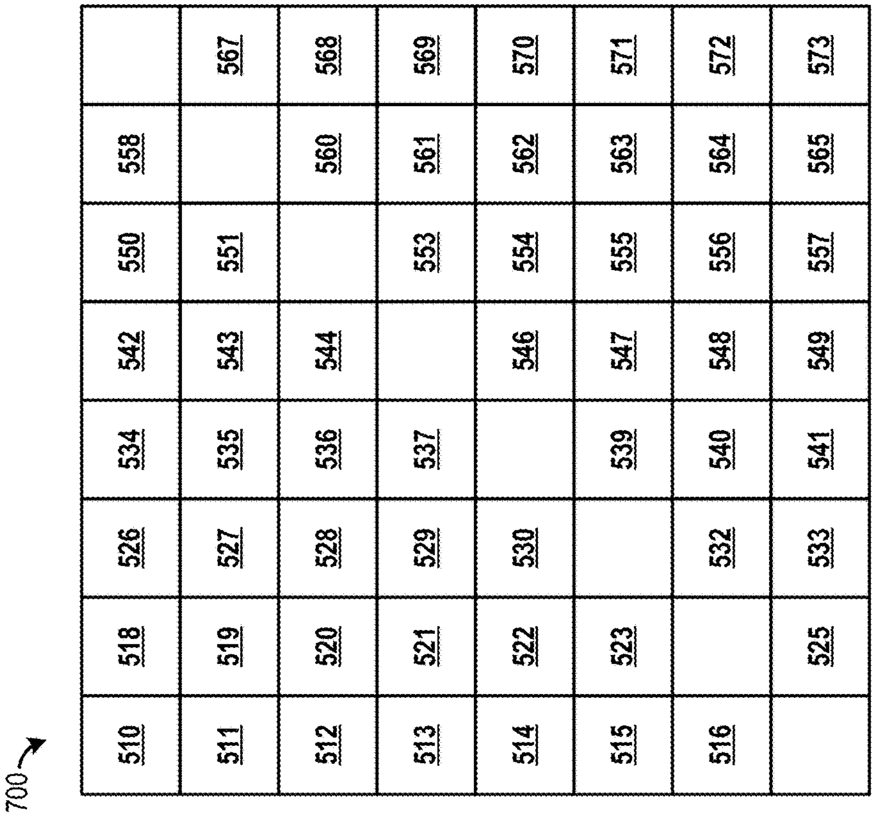
Figure 7M:
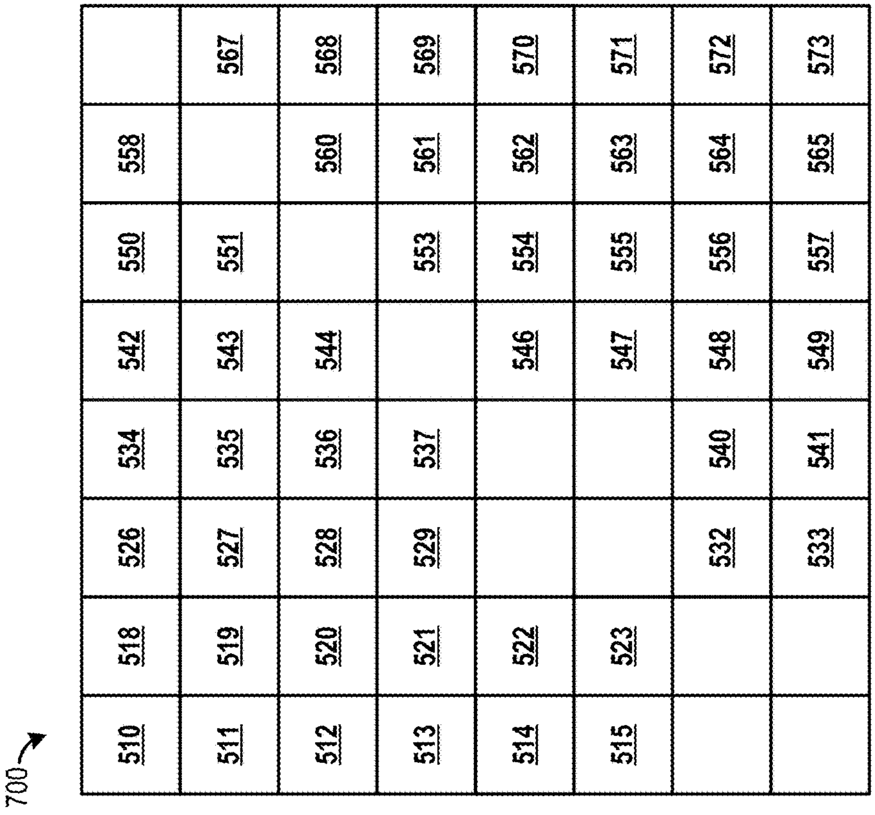
Figure 7P:
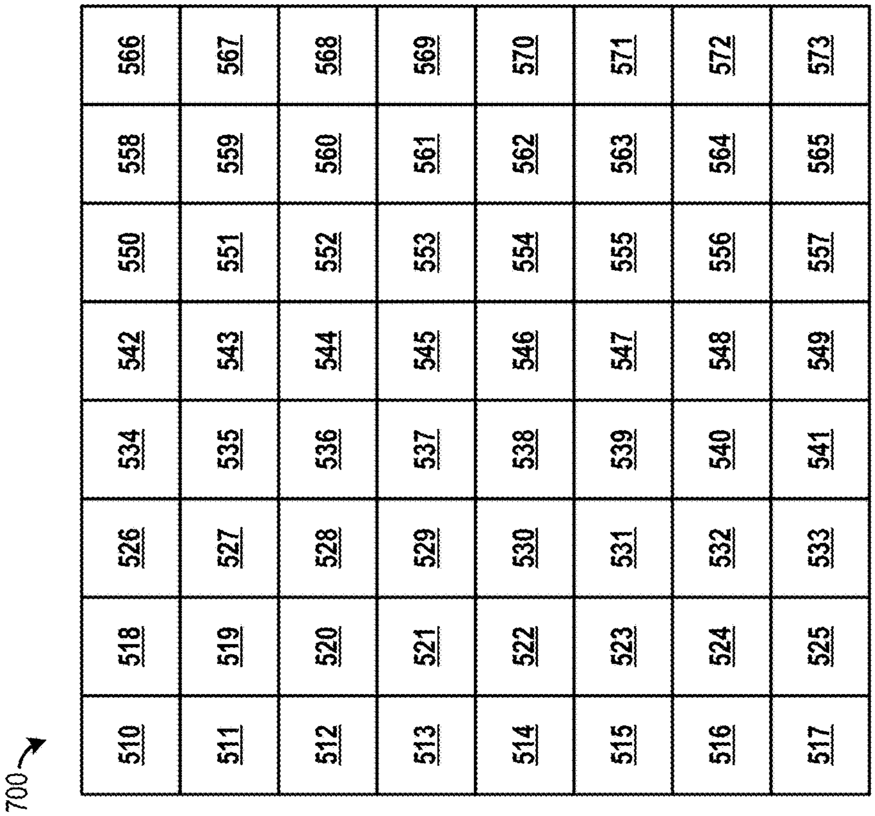

FIGS. 6A-6P illustrate an example processing pattern of submatrices for transposing matrix 505 according to some embodiments. FIGS. 7A-7P illustrate the output of the processing pattern of submatrices for transposing matrix 505 according to some embodiments. FIG. 6A illustrates a first group of submatrices in matrix 505 that are transposed. Here, each of the submatrices 510, 519, 528, and 537 are simultaneously transposed in the same manner as that shown in FIGS. 3A-3J. FIG. 7A illustrates matrix 700, which is the output of the transposed matrix 500 in this example. In particular, FIG. 7A illustrates matrix 700 after the first group of transposed submatrices in matrix 505 are simultaneously stored in matrix 700. As depicted, transposed submatrices 510, 519, 528, and 537 are stored in the same positions in matrix 700 as they were in matrix 505.

FIG. 6B illustrates a second group of submatrices in matrix 505 that are transposed. As depicted in FIG. 6B, each of the submatrices 546, 555, 564, and 573 are simultaneously transposed in the same manner as that shown in FIGS. 3A-3J. FIG. 7B illustrates matrix 700 after the second group of transposed submatrices 546, 555, 564, and 573 are simultaneously stored in matrix 700. As shown, transposed submatrices 546, 555, 564, and 573 are stored in the same positions in matrix 700 as they were stored in matrix 505.

Next, FIG. 6C illustrates a third group of submatrices in matrix 505 that are transposed. Specifically, each of the submatrices 518, 511, 536, and 529 are simultaneously transposed in the same manner as that shown in FIGS. 3A-3J. FIG. 7C illustrates matrix 700 after the third group of transposed submatrices 518, 511, 536, and 529 are simultaneously stored in matrix 700. As illustrated, the positions of transposed submatrices 518 and 511 are swapped and the positions of transposed submatrices 536 and 529 are swapped.

FIG. 6D illustrates a fourth group of submatrices in matrix 505 that are transposed. As illustrated, each of the submatrices 554, 547, 572, and 565 are simultaneously transposed in the same manner as that shown in FIGS. 3A-3J. FIG. 7D illustrates matrix 700 after the fourth group of transposed submatrices 554, 547, 572, and 565 are simultaneously stored in matrix 700. As depicted, the positions of transposed submatrices 554 and 547 are swapped and the positions of transposed submatrices 572 and 565 are swapped.

FIG. 6E illustrates a fifth group of submatrices in matrix 505 that are transposed. Here, each of the submatrices 526, 535, 512, and 521 are simultaneously transposed in the same manner as that shown in FIGS. 3A-3J. FIG. 7E illustrates matrix 700 after the fifth group of transposed submatrices 526, 535, 512, and 521 are simultaneously stored in matrix 700. As shown, transposed submatrix 512 is stored in the third row of the first column of matrix 700, transposed submatrix 521 is stored in the fourth row of the second column of matrix 700, transposed submatrix 526 is stored in the first row of the third column of matrix 700, and transposed submatrix 535 is stored in the second row of the fourth column of matrix 700.

Then, FIG. 6F illustrates a sixth group of submatrices in matrix 505 that are transposed. As shown, each of the submatrices 562, 571, 548, and 557 are simultaneously transposed in the same manner as that shown in FIGS. 3A-3J. FIG. 7F illustrates matrix 700 after the sixth group of transposed submatrices 562, 571, 548, and 557 are simultaneously stored in matrix 700. As illustrated, transposed submatrix 548 is stored in the seventh row of the fifth column of matrix 700, transposed submatrix 557 is stored in the eighth row of the sixth column of matrix 700, transposed submatrix 562 is stored in the fifth row of the seventh column of matrix 700, and transposed submatrix 571 is stored in the sixth row of the eighth column of matrix 700.

Continuing with the example, FIG. 6G illustrates a seventh group of submatrices in matrix 505 that are transposed. In particular, each of the submatrices 534, 527, 520, and 513 are simultaneously transposed in the same manner as that shown in FIGS. 3A-3J. FIG. 7G illustrates matrix 700 after the seventh group of transposed submatrices 534, 527, 520, and 513 are simultaneously stored in matrix 700. As depicted, transposed submatrix 513 is stored in the fourth row of the first column of matrix 700, transposed submatrix 520 is stored in the third row of the second column of matrix 700, transposed submatrix 527 is stored in the second row of the third column of matrix 700, and transposed submatrix 534 is stored in the first row of the fourth column of matrix 700.

FIG. 6H illustrates an eighth group of submatrices in matrix 505 that are transposed. As illustrated, each of the submatrices 570, 563, 556, and 549 are simultaneously transposed in the same manner as that shown in FIGS.

3A-3J. FIG. 7H illustrates matrix 700 after the eighth group of transposed submatrices 570, 563, 556, and 549 are simultaneously stored in matrix 700. As shown, transposed submatrix 549 is stored in the eighth row of the fifth column of matrix 700, transposed submatrix 556 is stored in the seventh row of the sixth column of matrix 700, transposed submatrix 563 is stored in the sixth row of the seventh column of matrix 700, and transposed submatrix 570 is stored in the fifth row of the eighth column of matrix 700.

FIG. 6I illustrates a ninth group of submatrices in matrix 505 that are transposed. Here, each of the submatrices 542, 551, 560, and 569 are simultaneously transposed in the same manner as that shown in FIGS. 3A-3J. FIG. 7I illustrates matrix 700 after the ninth group of transposed submatrices 542, 551, 560, and 569 are simultaneously stored in matrix 700. As illustrated, transposed submatrix 542 is stored in the first row of the fifth column of matrix 700, transposed submatrix 551 is stored in the second row of the sixth column of matrix 700, transposed submatrix 560 is stored in the third row of the seventh column of matrix 700, and transposed submatrix 569 is stored in the fourth row of the eighth column of matrix 700.

FIG. 6J then illustrates a tenth group of submatrices in matrix 505 that are transposed. Here, each of the submatrices 514, 523, 532, and 541 are simultaneously transposed in the same manner as that shown in FIGS. 3A-3J. FIG. 7J illustrates matrix 700 after the tenth group of transposed submatrices 514, 523, 532, and 541 are simultaneously stored in matrix 700. As depicted, transposed submatrix 514 is stored in the fifth row of the first column of matrix 700, transposed submatrix 523 is stored in the sixth row of the second column of matrix 700, transposed submatrix 532 is stored in the seventh row of the third column of matrix 700, and transposed submatrix 541 is stored in the eighth row of the fourth column of matrix 700.

Next, FIG. 6K illustrates an eleventh group of submatrices in matrix 505 that are transposed. In particular, each of the submatrices 550, 543, 568, and 561 are simultaneously transposed in the same manner as that shown in FIGS. 3A-3J. FIG. 7K illustrates matrix 700 after the eleventh group of transposed submatrices 550, 543, 568, and 561 are simultaneously stored in matrix 700. As shown, transposed submatrix 543 is stored in the second row of the fifth column of matrix 700, transposed submatrix 550 is stored in the first row of the sixth column of matrix 700, transposed submatrix 561 is stored in the fourth row of the seventh column of matrix 700, and transposed submatrix 568 is stored in the third row of the eighth column of matrix 700.

FIG. 6L illustrates a twelfth group of submatrices in matrix 505 that are transposed. As depicted, each of the submatrices 522, 515, 540, and 533 are simultaneously transposed in the same manner as that shown in FIGS. 3A-3J. FIG. 7L illustrates matrix 700 after the twelfth group of transposed submatrices 522, 515, 540, and 533 are simultaneously stored in matrix 700. As illustrated, transposed submatrix 515 is stored in the sixth row of the first column of matrix 700, transposed submatrix 522 is stored in the fifth row of the second column of matrix 700, transposed submatrix 533 is stored in the eighth row of the third column of matrix 700, and transposed submatrix 540 is stored in the seventh row of the fourth column of matrix 700.

FIG. 6M illustrates a thirteenth group of submatrices in matrix 505 that are transposed. In this example, each of the submatrices 558, 567, 544, and 553 are simultaneously transposed in the same manner as that shown in FIGS. 3A-3J. FIG. 7M illustrates matrix 700 after the thirteenth group of transposed submatrices 558, 567, 544, and 553 are simultaneously stored in matrix 700. As shown, transposed submatrix 544 is stored in the third row of the fifth column of matrix 700, transposed submatrix 553 is stored in the fourth row of the sixth column of matrix 700, transposed submatrix 558 is stored in the first row of the seventh column of matrix 700, and transposed submatrix 567 is stored in the second row of the eighth column of matrix 700.

Then, FIG. 6N illustrates a fourteenth group of submatrices in matrix 505 that are transposed. As illustrated in FIG. 6N, each of the submatrices 530, 539, 516, and 525 are simultaneously transposed in the same manner as that shown in FIGS. 3A-3J. FIG. 7N illustrates matrix 700 after the fourteenth group of transposed submatrices 530, 539, 516, and 525 are simultaneously stored in matrix 700. As depicted, transposed submatrix 516 is stored in the seventh row of the first column of matrix 700, transposed submatrix 525 is stored in the eighth row of the second column of matrix 700, transposed submatrix 530 is stored in the fifth row of the third column of matrix 700, and transposed submatrix 539 is stored in the sixth row of the fourth column of matrix 700.

Figure 6O:
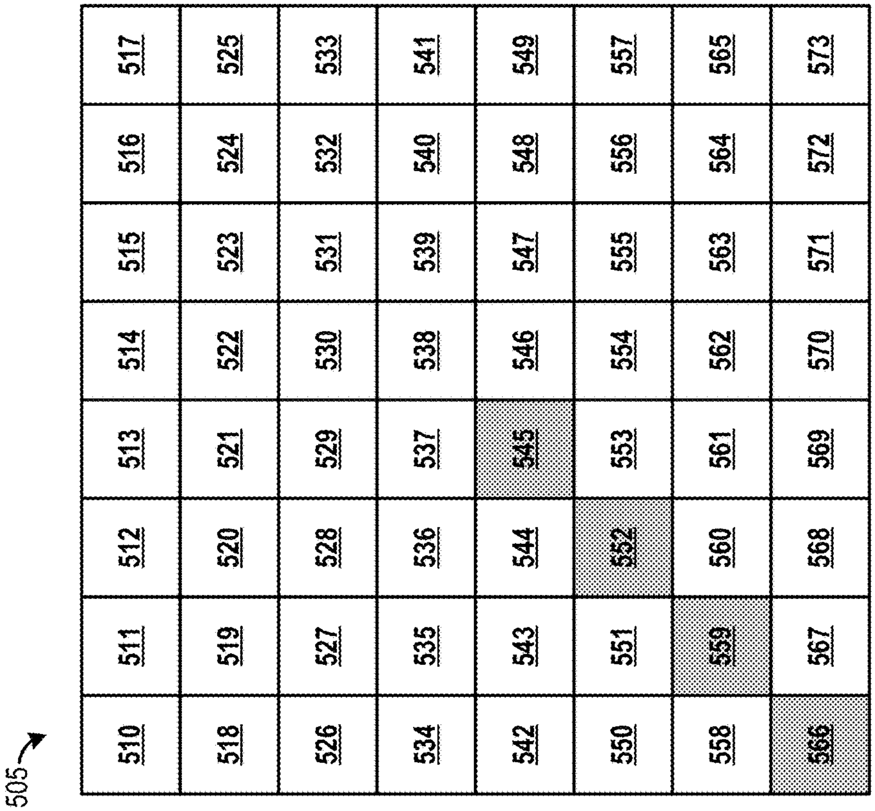
Figure 7O:
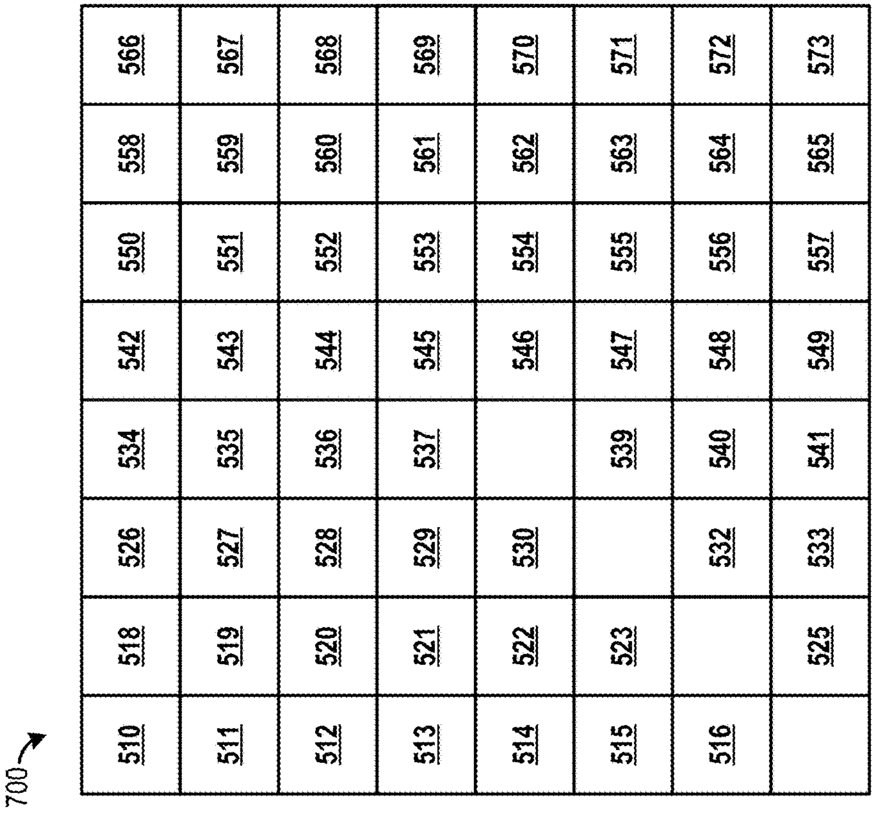

Continuing with the example, FIG. 6O illustrates a fifteenth group of submatrices in matrix 505 that are transposed. Specifically, each of the submatrices 566, 559, 552, and 545 are simultaneously transposed in the same manner as that shown in FIGS. 3A-3J. FIG. 7O illustrates matrix 700 after the fifteenth group of transposed submatrices 566, 559, 552, and 545 are simultaneously stored in matrix 700. As illustrated, transposed submatrix 545 is stored in the fourth row of the fifth column of matrix 700, transposed submatrix 552 is stored in the third row of the sixth column of matrix 700, transposed submatrix 559 is stored in the second row of the seventh column of matrix 700, and transposed submatrix 566 is stored in the first row of the eighth column of matrix 700.

FIG. 6P illustrates a sixteenth group of submatrices in matrix 505 that are transposed. Here, each of the submatrices 538, 531, 524, and 517 are simultaneously transposed in the same manner as that shown in FIGS. 3A-3J. FIG. 7P illustrates matrix 700 after the sixteenth group of transposed submatrices 538, 531, 524, and 517 are simultaneously stored in matrix 700. As shown, transposed submatrix 517 is stored in the eighth row of the first column of matrix 700, transposed submatrix 524 is stored in the seventh row of the second column of matrix 700, transposed submatrix 531 is stored in the sixth row of the third column of matrix 700, and transposed submatrix 538 is stored in the fifth row of the fourth column of matrix 700.

Figure 8:
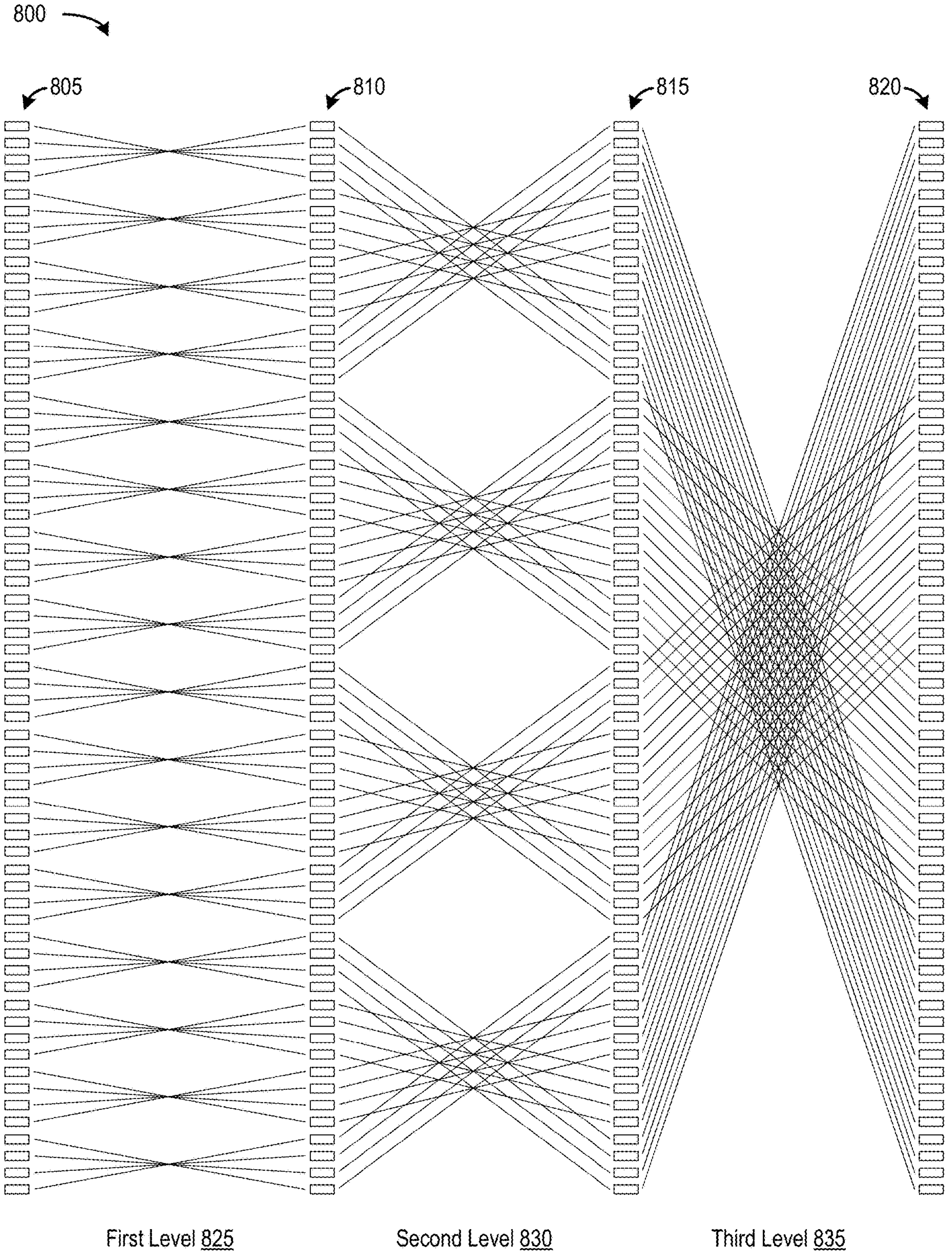
FIG. 8 illustrates an architecture of another multi-level crossbar according to some embodiments.

FIG. 8 illustrates an architecture of another multi-level crossbar 800 according to some embodiments. In some embodiments, multi-level crossbar 800 is the multi-level crossbar used to transpose matrix 500. In some embodiments, multi-level crossbar 800 is used to implement the multi-level cross used in the example transpose operation described above by reference to FIGS. 5-7. Specifically, multi-level crossbar 800 is used to shuffle the order of the submatrices and provide the shuffled submatrices to the output buffer before the output buffer stores the shuffled submatrices in the determined positions in matrix 700.

As illustrated, multi-level crossbar 800 includes inputs 805, first level 825, first level outputs 810, second level 830, second level outputs 815, third level 835, and third level outputs 820. Inputs 805 are the inputs of multi-level crossbar 800 and third level outputs 820 are the outputs of multi-level crossbar 800. Each of the inputs 805 may be configured forward its input to any of four of the first level outputs 810, as depicted in FIG. 8. In some embodiments, first level 825 is implemented using multiplexers. For example, first level 825 can be implemented using 4-to-1 multiplexers.

First level outputs 810 serve as the inputs to second level 830. Each of the first level outputs 810 can be configured forward its input to any of four of the second level outputs 815, as shown in FIG. 8. Here, second level outputs 815 are the outputs of second level 830. In some embodiments, second level 830 is implemented using multiplexers. For instance, second level 830 may be implemented using 4-to-1 multiplexers.

Second level outputs 815 serve as the inputs to third level 835. Each of the second level outputs 815 may be configured forward its input to any of four of the third level outputs 820, as illustrated in FIG. 8. Third level outputs 820 are the outputs of third level 835. In some embodiments, third level 835 is implemented using multiplexers. For example, third level 835 can be implemented using 4-to-1 multiplexers.

Interconnecting inputs 805 with first level outputs 810, first level outputs 810 with second level outputs 815, and second level outputs 815 with third level outputs 820 in the way shown in FIG. 8 allows each of the inputs 805 to be routed to any of the third level outputs 820. In this fashion, multi-level crossbar 800 is able to perform the transpose operations for transposing matrix 505. In cases where the size of the elements in matrix 505 is the same as the size of each of the inputs 805, half of the inputs (e.g., the first 32 inputs 805) can be utilized to transpose matrix 505. Multi-level crossbar 800 can still be used for cases where the size of the elements in matrix 505 is different than the inputs of multi-level crossbar 800. For example, if the size of the elements in matrix 505 is 32-bits and the size of each of the inputs 805 is 16-bits, multi-level crossbar 800 may handle 32-bit values by using pairs of inputs 805 to handle 32-bit values; configuring multi-level crossbar 800 to route the 32-bit values through first level 825, the second level 830, and the third level 835; and using pairs of the third level outputs 820 to output the shuffled 32-bit values.

Figure 9:
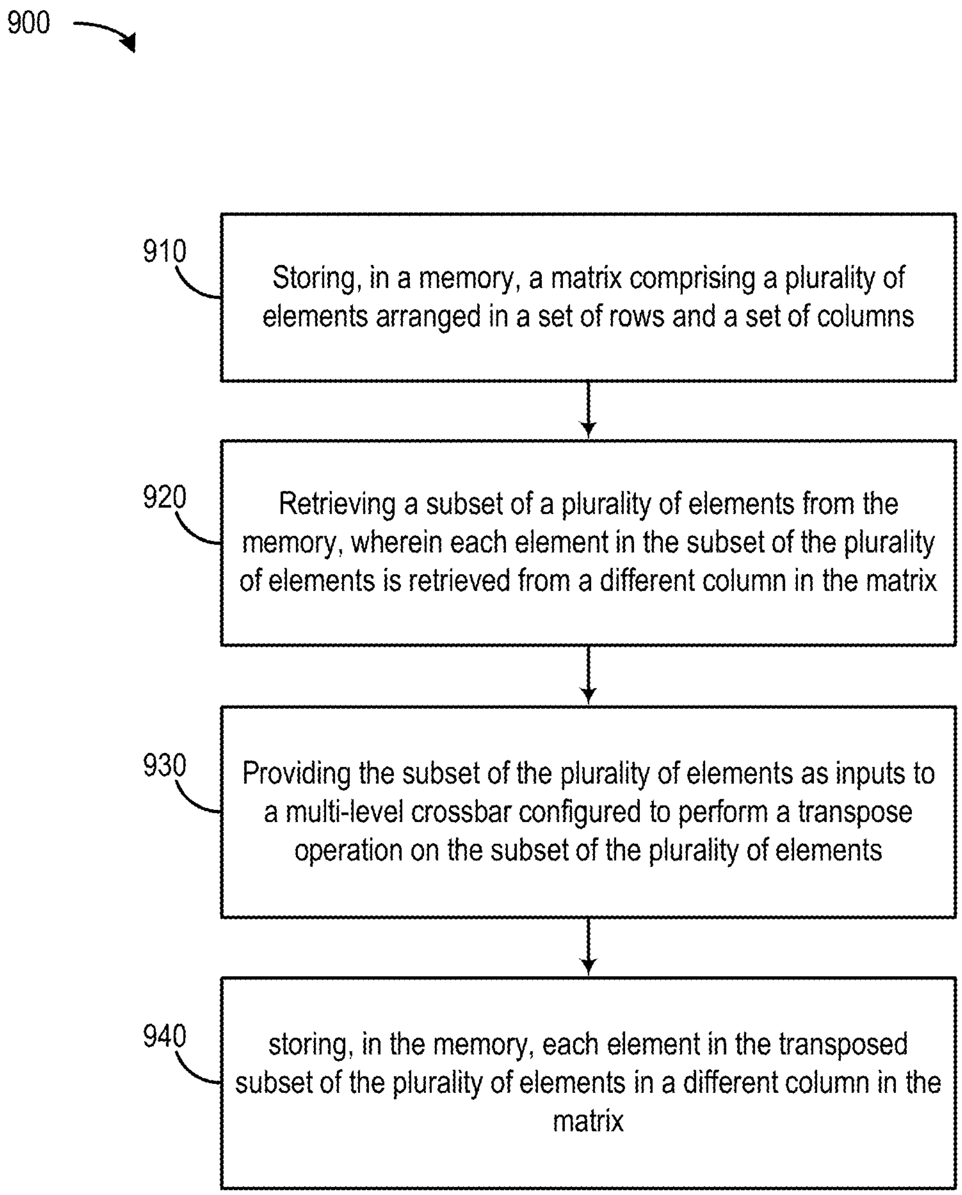
FIG. 9 illustrates a process for transposing a matrix based on a multi-level crossbar according to some embodiments.

FIG. 9 illustrates a process 900 for transposing a matrix based on a multi-level crossbar according to some embodiments. In some embodiments, system 100 performs process 900. Process 900 begins by storing, at 910, in a memory, a matrix comprising a plurality of elements arranged in a set of rows and a set of columns. Referring to FIG. 2 as an example, matrix 200 may be stored in memory 205.

Next, process 900 retrieves, at 920, a subset of a plurality of elements from the memory. Each element in the subset of the plurality of elements is retrieved from a different column in the matrix. Referring to FIG. 3B as an example, input buffer 350 can retrieve a second set of elements (elements 9, 2, 27, 20, 45, 38, 63, and 56 in this example) of matrix 200 from memory 205.

Then, process 900 provides, at 930, the subset of the plurality of elements as inputs to a multi-level crossbar configured to perform a transpose operation on the subset of the plurality of elements. Referring to FIG. 3B as an example, input buffer 350 provides the second set of elements of matrix 200 to multi-level crossbar 360. Multi-level crossbar 360 is configured to transpose the second set of elements.

Finally, process 900 stores, at 940, in the memory, each element in the transposed subset of the plurality of elements in a different column in the matrix. Referring to FIG. 3C as an example, output buffer 365 stores the transposed second set of elements in memory 370.

Figure 10:
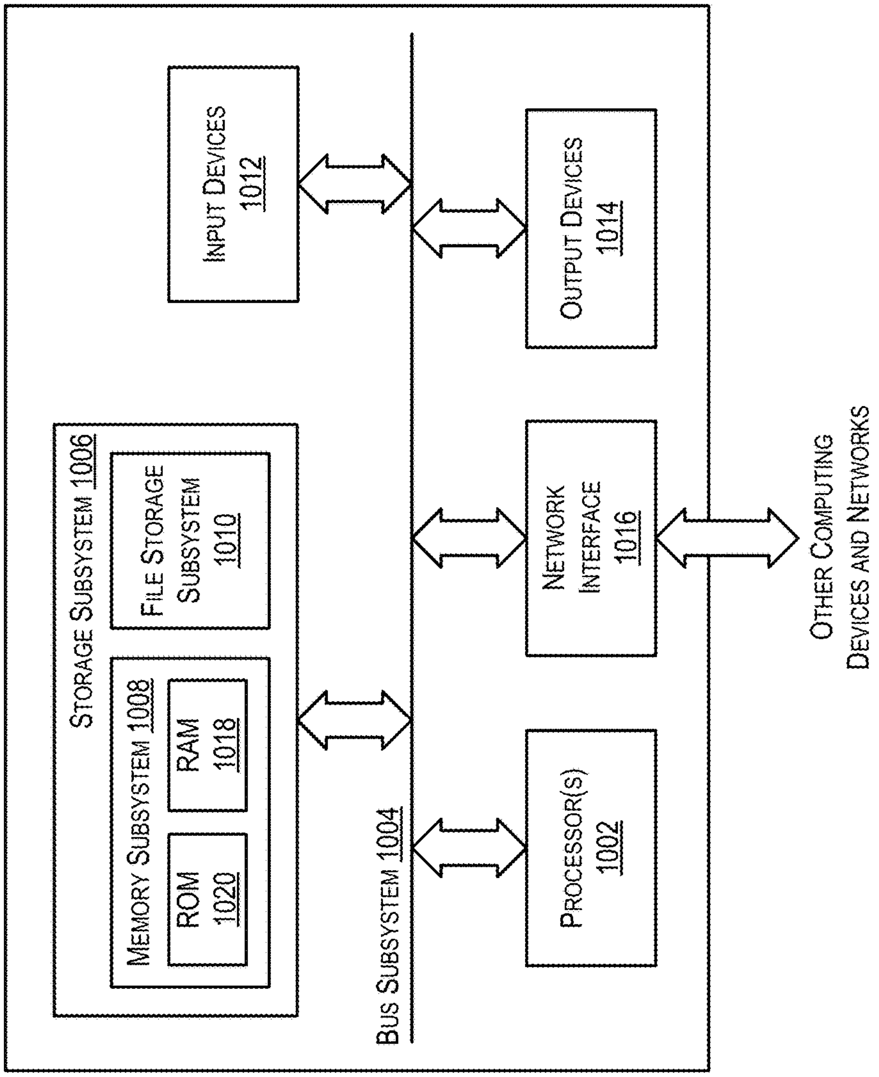
FIG. 10 depicts a simplified block diagram of an example computer system according to some embodiments.

FIG. 10 depicts a simplified block diagram of an example computer system 1000, which can be used to implement the techniques described in the foregoing disclosure. As shown in FIG. 10, computer system 1000 includes one or more processors 1002 that communicate with a number of peripheral devices via a bus subsystem 1004. These peripheral devices may include a storage subsystem 1006 (e.g., comprising a memory subsystem 1008 and a file storage subsystem 1010) and a network interface subsystem 1016. Some computer systems may further include user interface input devices 1012 and/or user interface output devices 1014.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between computer system 1000 and other computer systems or networks. Embodiments of network interface subsystem 1016 can include, e.g., Ethernet, a Wi-Fi and/or cellular adapter, a modem (telephone, satellite, cable, ISDN, etc.), digital subscriber line (DSL) units, and/or the like.

Storage subsystem 1006 includes a memory subsystem 1008 and a file/disk storage subsystem 1010. Subsystems 1008 and 1010 as well as other memories described herein are examples of non-transitory computer-readable storage media that can store executable program code and/or data that provide the functionality of embodiments of the present disclosure.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Figure 11:
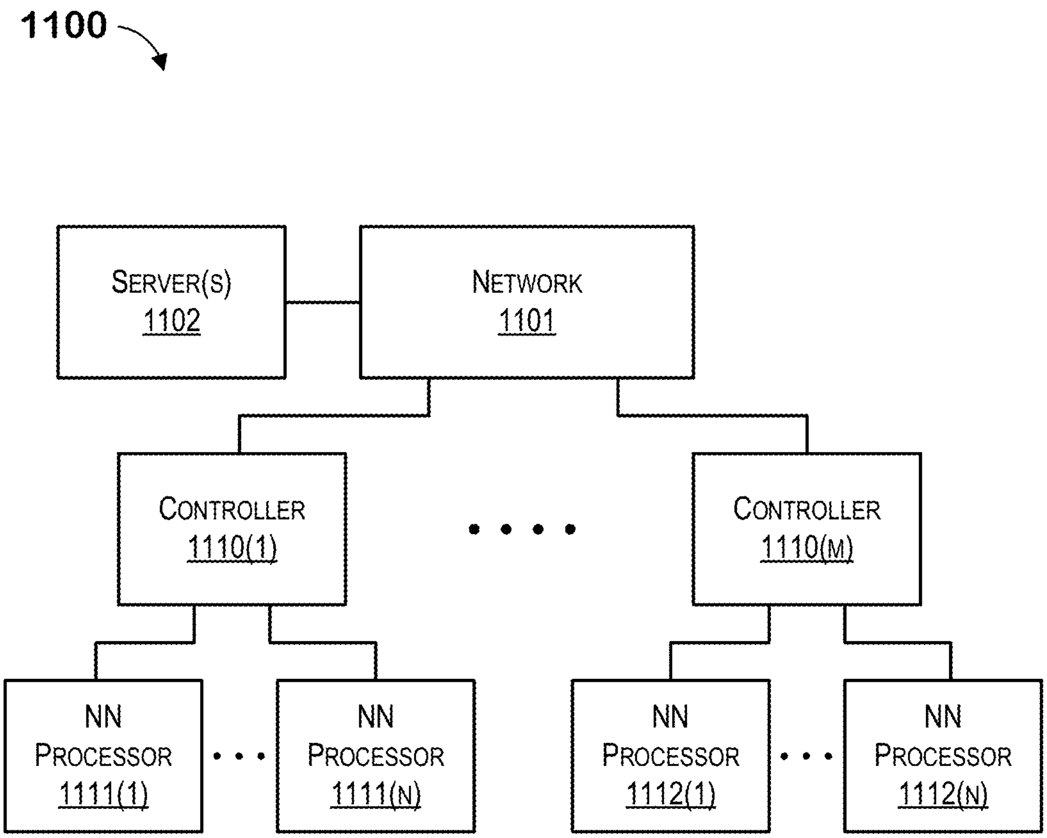
FIG. 11 illustrates a neural network processing system according to some embodiments.

FIG. 11 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1102, which may comprise architectures illustrated in FIG. 10 above, may be coupled to a plurality of controllers 1110(1)-1110(M) over a communication network 1101 (e.g., switches, routers, etc.). Controllers 1110(1)-1110(M) may also comprise architectures illustrated in FIG. 10 above. Each controller 1110(1)-1110(M) may be coupled to one or more NN processors, such as processors 1111(1)-1111(N) and 1112(1)-1112(N), for example. NN processors 1111(1)-1111(N) and 1112(1)-1112(N) may include a variety of configurations of functional processing blocks and memory optimized for neural network processing, such as training or inference. For example, in some embodiments, NN processors 1111(1)-1111(N) and 1112(1)-1112(N) may include the system and/or architectures described above by reference to FIGS. 1, 4, and 8. In addition, in some such embodiments, NN processors 1111 (1)-1111(N) and 1112(1)-1112(N) are configured to transpose matrices in the same or similar manner as the examples described above by reference to FIGS. 2, 3, 5-7, and 9. The NN processors are optimized for neural network computations. Server 1102 may configure controllers 1110 with NN models as well as input data to the models, which may be loaded and executed by NN processors 1111(1)-1111(N) and 1112(1)-1112(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for transposing matrices based on a multi-level crossbar. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in some embodiments, the techniques described herein relate to a system including: a memory configured to store a matrix including a plurality of elements arranged in a set of rows and a set of columns; an input buffer configured to retrieve a subset of a plurality of elements from the memory, wherein each element in the subset of the plurality of elements is retrieved from a different column in the matrix; a multi-level crossbar configured to perform a transpose operation on the subset of the plurality of elements; and an output buffer configured to receive the transposed subset of the plurality of elements and store, in the memory, each element in the transposed subset of the plurality of elements in a different column in the matrix.

In some embodiments, the techniques described herein relate to a system, wherein the memory includes a plurality of memory banks, wherein the input buffer retrieves the subset of the plurality of elements from the memory by retrieving the subset of the plurality of elements from a subset of the plurality of memory banks.

In some embodiments, the techniques described herein relate to a system, wherein the input buffer retrieves the subset of the plurality of elements from the subset of the plurality of memory banks by retrieving each element in the subset of the plurality of elements from a different memory bank in the subset of the plurality of memory banks.

In some embodiments, the techniques described herein relate to a system, wherein the subset of the plurality of memory banks is a first subset of the plurality of memory banks, wherein the output buffer stores, in the memory, the transposed subset of the plurality of elements by storing the transposed subset of the plurality of elements in a second subset of the plurality of memory banks.

In some embodiments, the techniques described herein relate to a system, wherein the output buffer stores the transposed subset of the plurality of elements in the second subset of the plurality of memory banks by storing each element in the transposed subset of the plurality of elements in a different memory bank of the second subset of the plurality of memory banks.

In some embodiments, the techniques described herein relate to a system, wherein the subset of the plurality of elements is a first subset of the plurality of elements, wherein the transpose operation is a first transpose operation, wherein the input buffer is further configured to retrieve a second subset of the plurality of elements from the memory, wherein each element in the second subset of the plurality of elements is retrieved from a different column in the matrix, wherein the multi-level crossbar is further configured to perform a second transpose operation on the second subset of the plurality of elements, wherein the output buffer is further configured to receive the transposed second subset of the plurality of elements and store, in the memory, each element in the transposed second subset of the plurality of elements in a different column in the matrix.

In some embodiments, the techniques described herein relate to a system, wherein the input buffer retrieves the first subset of the plurality of elements and the second subset of the plurality of elements simultaneously, wherein the multi-level crossbar performs the first transpose operation on the first subset of the plurality of elements and the second transpose operation on the second subset of the plurality of elements simultaneously, wherein the output buffer stores, in the memory, the transposed first subset of the plurality of elements and the transposed second subset of the plurality of elements simultaneously.

In some embodiments, the techniques described herein relate to a method including: storing, in a memory, a matrix including a plurality of elements arranged in a set of rows and a set of columns; retrieving a subset of a plurality of elements from the memory, wherein each element in the subset of the plurality of elements is retrieved from a different column in the matrix; providing the subset of the plurality of elements as inputs to a multi-level crossbar configured to perform a transpose operation on the subset of the plurality of elements; and storing, in the memory, each element in the transposed subset of the plurality of elements in a different column in the matrix.

In some embodiments, the techniques described herein relate to a method, wherein the memory includes a plurality of memory banks, wherein retrieving the subset of the plurality of elements from the memory includes retrieving the subset of the plurality of elements from a subset of the plurality of memory banks.

In some embodiments, the techniques described herein relate to a method, wherein retrieving the subset of the plurality of elements from the subset of the plurality of memory banks includes retrieving each element in the subset of the plurality of elements from a different memory bank in the subset of the plurality of memory banks.

In some embodiments, the techniques described herein relate to a method, wherein the subset of the plurality of memory banks is a first subset of the plurality of memory banks, wherein storing, in the memory, the transposed subset of the plurality of elements includes storing the transposed subset of the plurality of elements in a second subset of the plurality of memory banks.

In some embodiments, the techniques described herein relate to a method, wherein storing the transposed subset of the plurality of elements in the second subset of the plurality of memory banks includes storing each element in the transposed subset of the plurality of elements in a different memory bank of the second subset of the plurality of memory banks.

In some embodiments, the techniques described herein relate to a method, wherein the subset of the plurality of elements is a first subset of the plurality of elements, wherein the transpose operation is a first transpose operation, the method further including retrieving a second subset of the plurality of elements from the memory, wherein each element in the second subset of the plurality of elements is retrieved from a different column in the matrix; providing the second subset of the plurality of elements as inputs to the multi-level crossbar, wherein the multi-level crossbar is further configured to perform a second transpose operation on the second subset of the plurality of elements; storing, in the memory, each element in the transposed second subset of the plurality of elements in a different column in the matrix.

In some embodiments, the techniques described herein relate to a method, wherein the first subset of the plurality of elements and the second subset of the plurality of elements are retrieved simultaneously, wherein the first transpose operation and the second transpose operation are performed simultaneously, wherein the transposed first subset of the plurality of elements and the transposed second subset of the plurality of elements are stored simultaneously.

In some embodiments, the techniques described herein relate to a circuit including a first circuit configured to store a matrix including a plurality of elements arranged in a set of rows and a set of columns; a second circuit configured to retrieve a subset of a plurality of elements from the first circuit, wherein each element in the subset of the plurality of elements is retrieved from a different column in the matrix; a third circuit configured to perform a transpose operation on the subset of the plurality of elements; and a fourth circuit configured to receive the transposed subset of the plurality of elements and store, in the first circuit, each element in the transposed subset of the plurality of elements in a different column in the matrix.

In some embodiments, the techniques described herein relate to a circuit, wherein the first circuit includes a plurality of memory banks, wherein the second circuit retrieves the subset of the plurality of elements from the first circuit by retrieving the subset of the plurality of elements from a subset of the plurality of memory banks.

In some embodiments, the techniques described herein relate to a circuit, wherein the second circuit retrieves the subset of the plurality of elements from the subset of the plurality of memory banks by retrieving each element in the subset of the plurality of elements from a different memory bank in the subset of the plurality of memory banks.

In some embodiments, the techniques described herein relate to a circuit, wherein the subset of the plurality of memory banks is a first subset of the plurality of memory banks, wherein the fourth circuit stores, in the memory, the transposed subset of the plurality of elements by storing the transposed subset of the plurality of elements in a second subset of the plurality of memory banks.

In some embodiments, the techniques described herein relate to a circuit, wherein the fourth circuit stores the transposed subset of the plurality of elements in the second subset of the plurality of memory banks by storing each element in the transposed subset of the plurality of elements in a different memory bank of the second subset of the plurality of memory banks.

In some embodiments, the techniques described herein relate to a circuit, wherein the subset of the plurality of elements is a first subset of the plurality of elements, wherein the transpose operation is a first transpose operation, wherein the second circuit is further configured to retrieve a second subset of the plurality of elements from the first circuit, wherein each element in the second subset of the plurality of elements is retrieved from a different column in the matrix, wherein the third circuit is further configured to perform a second transpose operation on the second subset of the plurality of elements, wherein the fourth circuit is further configured to receive the transposed second subset of the plurality of elements and store, in the first circuit, each element in the transposed second subset of the plurality of elements in a different column in the matrix.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:

a memory configured to store a matrix comprising a plurality of elements arranged in a set of rows and a set of columns;

an input buffer configured to retrieve a subset of a plurality of elements from the memory, wherein each element in the subset of the plurality of elements is retrieved from a different column in the matrix;

a multi-level crossbar configured to perform a transpose operation on the subset of the plurality of elements; and an output buffer configured to receive the transposed subset of the plurality of elements and store, in the memory, each element in the transposed subset of the plurality of elements in a different column in the matrix.

2. The system of claim 1, wherein the memory comprises a plurality of memory banks, wherein the input buffer retrieves the subset of the plurality of elements from the memory by retrieving the subset of the plurality of elements from a subset of the plurality of memory banks.

3. The system of claim 2, wherein the input buffer retrieves the subset of the plurality of elements from the subset of the plurality of memory banks by retrieving each element in the subset of the plurality of elements from a different memory bank in the subset of the plurality of memory banks.

4. The system of claim 2, wherein the subset of the plurality of memory banks is a first subset of the plurality of memory banks, wherein the output buffer stores, in the memory, the transposed subset of the plurality of elements by storing the transposed subset of the plurality of elements in a second subset of the plurality of memory banks.

5. The system of claim 4, wherein the output buffer stores the transposed subset of the plurality of elements in the second subset of the plurality of memory banks by storing each element in the transposed subset of the plurality of elements in a different memory bank of the second subset of the plurality of memory banks.

6. The system of claim 1, wherein the subset of the plurality of elements is a first subset of the plurality of elements, wherein the transpose operation is a first transpose operation, wherein the input buffer is further configured to retrieve a second subset of the plurality of elements from the memory, wherein each element in the second subset of the plurality of elements is retrieved from a different column in the matrix, wherein the multi-level crossbar is further configured to perform a second transpose operation on the second subset of the plurality of elements, and wherein the output buffer is further configured to receive the transposed second subset of the plurality of elements and store, in the memory, each element in the transposed second subset of the plurality of elements in a different column in the matrix.

7. The system of claim 6, wherein the input buffer retrieves the first subset of the plurality of elements and the second subset of the plurality of elements simultaneously, wherein the multi-level crossbar performs the first transpose operation on the first subset of the plurality of elements and the second transpose operation on the second subset of the plurality of elements simultaneously, wherein the output buffer stores, in the memory, the transposed first subset of the plurality of elements and the transposed second subset of the plurality of elements simultaneously.

8. A method comprising:

storing, in a memory, a matrix comprising a plurality of elements arranged in a set of rows and a set of columns;

retrieving a subset of a plurality of elements from the memory, wherein each element in the subset of the plurality of elements is retrieved from a different column in the matrix;

providing the subset of the plurality of elements as inputs to a multi-level crossbar configured to perform a transpose operation on the subset of the plurality of elements; and storing, in the memory, each element in the transposed subset of the plurality of elements in a different column in the matrix.

9. The method of claim 8, wherein the memory comprises a plurality of memory banks, wherein retrieving the subset of the plurality of elements from the memory comprises retrieving the subset of the plurality of elements from a subset of the plurality of memory banks.

10. The method of claim 9, wherein retrieving the subset of the plurality of elements from the subset of the plurality of memory banks comprises retrieving each element in the subset of the plurality of elements from a different memory bank in the subset of the plurality of memory banks.

11. The method of claim 9, wherein the subset of the plurality of memory banks is a first subset of the plurality of memory banks, wherein storing, in the memory, the transposed subset of the plurality of elements comprises storing the transposed subset of the plurality of elements in a second subset of the plurality of memory banks.

12. The method of claim 11, wherein storing the transposed subset of the plurality of elements in the second subset of the plurality of memory banks comprises storing each element in the transposed subset of the plurality of elements in a different memory bank of the second subset of the plurality of memory banks.

13. The method of claim 8, wherein the subset of the plurality of elements is a first subset of the plurality of elements, wherein the transpose operation is a first transpose operation, the method further comprising:

retrieving a second subset of the plurality of elements from the memory, wherein each element in the second subset of the plurality of elements is retrieved from a different column in the matrix;

providing the second subset of the plurality of elements as inputs to the multi-level crossbar, wherein the multi-level crossbar is further configured to perform a second transpose operation on the second subset of the plurality of elements; and storing, in the memory, each element in the transposed second subset of the plurality of elements in a different column in the matrix.

14. The method of claim 13, wherein the first subset of the plurality of elements and the second subset of the plurality of elements are retrieved simultaneously, wherein the first transpose operation and the second transpose operation are performed simultaneously, wherein the transposed first subset of the plurality of elements and the transposed second subset of the plurality of elements are stored simultaneously.

15. A circuit comprising:

a means for storing a matrix comprising a plurality of elements arranged in a set of rows and a set of columns;

a means for retrieving a subset of a plurality of elements from the first circuit, wherein each element in the subset of the plurality of elements is retrieved from a different column in the matrix;

a means for performing a transpose operation on the subset of the plurality of elements; and a means for receiving the transposed subset of the plurality of elements and storing, in the means for storing, each element in the transposed subset of the plurality of elements in a different column in the matrix.

16. The circuit of claim 15, wherein the means for storing comprises a plurality of memory banks, wherein the means for retrieving retrieves the subset of the plurality of elements from the means for storing by retrieving the subset of the plurality of elements from a subset of the plurality of memory banks.

17. The circuit of claim 16, wherein the means for retrieving retrieves the subset of the plurality of elements from the subset of the plurality of memory banks by retrieving each element in the subset of the plurality of elements from a different memory bank in the subset of the plurality of memory banks.

18. The circuit of claim 16, wherein the subset of the plurality of memory banks is a first subset of the plurality of memory banks, wherein the means for receiving stores, in memory, the transposed subset of the plurality of elements by storing the transposed subset of the plurality of elements in a second subset of the plurality of memory banks.

19. The circuit of claim 18, wherein the means for receiving stores the transposed subset of the plurality of elements in the second subset of the plurality of memory banks by storing each element in the transposed subset of the plurality of elements in a different memory bank of the second subset of the plurality of memory banks.

20. The circuit of claim 15, wherein the subset of the plurality of elements is a first subset of the plurality of elements, wherein the transpose operation is a first transpose operation, wherein the means for retrieving is further configured to retrieve a second subset of the plurality of elements from the first circuit, wherein each element in the second subset of the plurality of elements is retrieved from a different column in the matrix, wherein the means for performing is further configured to perform a second transpose operation on the second subset of the plurality of elements, and wherein the means for receiving is further configured to receive the transposed second subset of the plurality of elements and store, in the first circuit, each element in the transposed second subset of the plurality of elements in a different column in the matrix.

* * * * *